United States Patent [19]

Mogami

[11] Patent Number: 4,540,249

[45] Date of Patent: Sep. 10, 1985

[54] WIDE ANGLE ZOOM LENS

[75] Inventor: Satoshi Mogami, Tokyo, Japan

[73] Assignee: Nippon Kogaku K.K., Tokyo, Japan

[21] Appl. No.: 391,828

[22] Filed: Jun. 24, 1982

[30] Foreign Application Priority Data

Jul. 3, 1981 [JP] Japan ................................. 56-103245

[51] Int. Cl.³ ...................... G02B 13/18; G02B 15/14
[52] U.S. Cl. ..................................... 350/426; 350/432
[58] Field of Search ......................... 350/426, 432–435

[56] References Cited

U.S. PATENT DOCUMENTS

| | | | |
|---|---|---|---|
| 4,153,339 | 1/1979 | Tajima et al. | 350/426 |
| 4,159,865 | 7/1979 | Kawamura et al. | 350/426 |
| 4,333,711 | 6/1982 | Itoh et al. | 350/426 |
| 4,364,641 | 12/1982 | Mogami | 350/426 |
| 4,400,064 | 8/1983 | Ikemori et al. | 350/426 |

*Primary Examiner*—John K. Corbin
*Assistant Examiner*—Scott J. Sugarman
*Attorney, Agent, or Firm*—Shapiro and Shapiro

[57] ABSTRACT

A wide angle zoom lens comprising, in succession from the object side, a divergent lens group and a convergent lens group and in which magnification change is effected by relative movement of the two groups is characterized in that the divergent lens group has a positive lens and at least one negative lens formed of a low-index high-dispersion material having a refractive index of 1.5 or less and an Abbe number of 62 or less.

18 Claims, 28 Drawing Figures

FIG. 9A
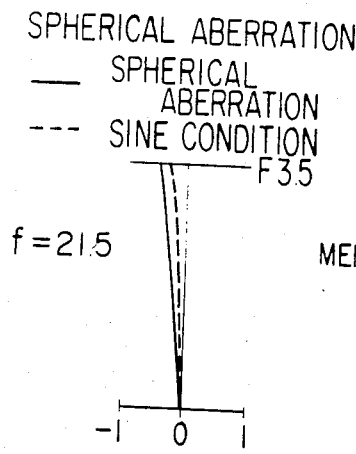
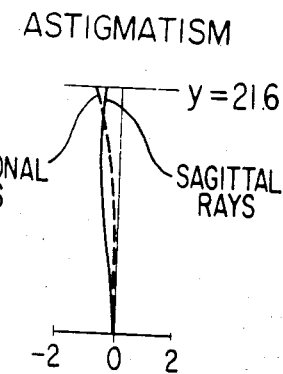
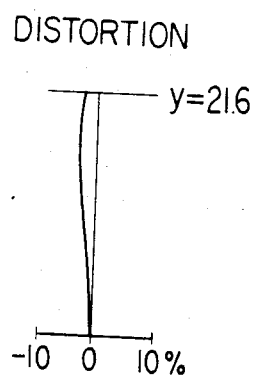
FIG. 9B
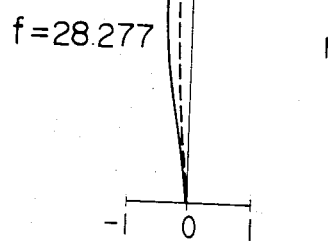
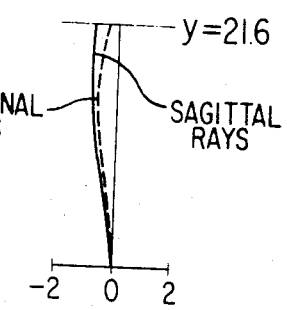
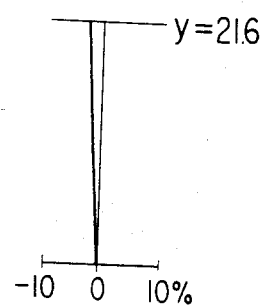
FIG. 9C
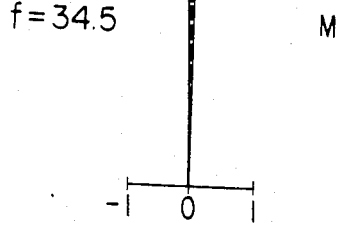
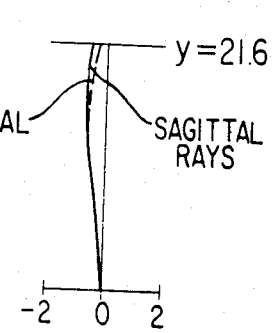
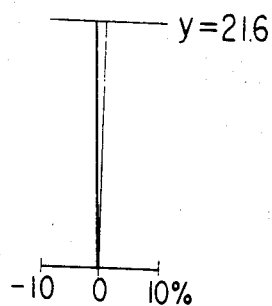

FIG. 10A

SPHERICAL ABERRATION
— SPHERICAL ABERRATION
--- SINE CONDITION f=21.5, F3.5

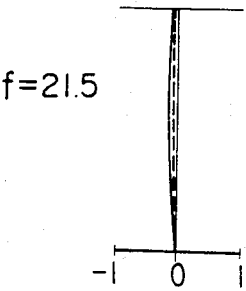

ASTIGMATISM, y=21.6, MERIDIONAL RAYS, SAGITTAL RAYS

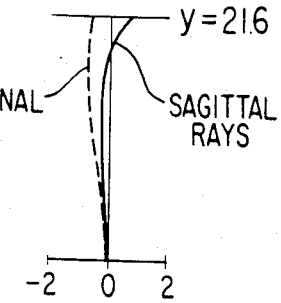

DISTORTION, y=21.6

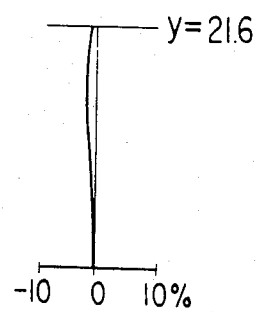

FIG. 10B

SPHERICAL ABERRATION
— SPHERICAL ABERRATION
--- SINE CONDITION f=28.277, F3.5

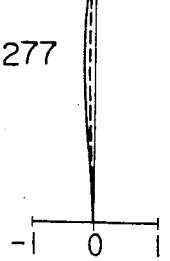

ASTIGMATISM, y=21.6, MERIDIONAL RAYS, SAGITTAL RAYS

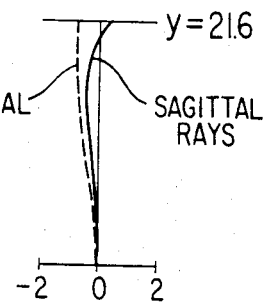

DISTORTION, y=21.6

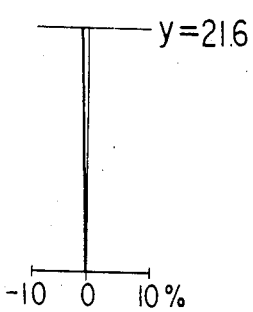

FIG. 10C

SPHERICAL ABERRATION
— SPHERICAL ABERRATION
--- SINE CONDITION f=34.5, F3.5

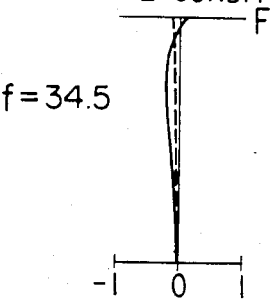

ASTIGMATISM, y=21.6, MERIDIONAL RAYS, SAGITTAL RAYS

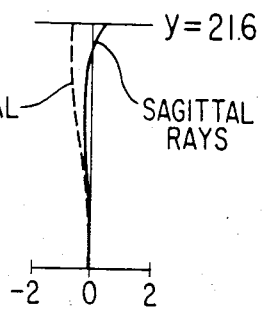

DISTORTION, y=21.6

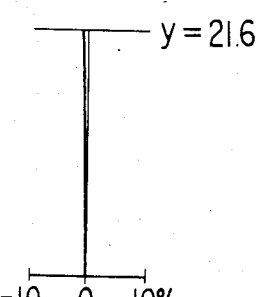

FIG. 11A

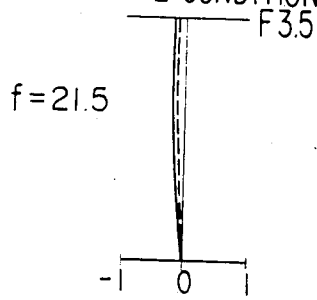
SPHERICAL ABERRATION
— SPHERICAL ABERRATION
--- SINE CONDITION
F3.5
f=21.5

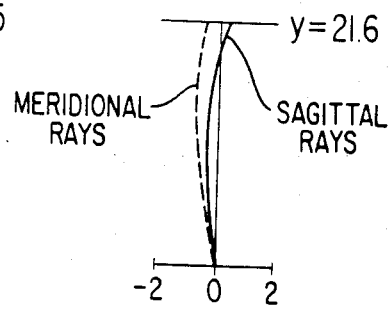
ASTIGMATISM
y=21.6
MERIDIONAL RAYS
SAGITTAL RAYS

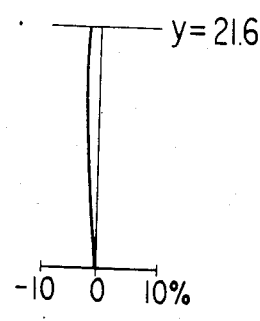
DISTORTION
y=21.6

FIG. 11B

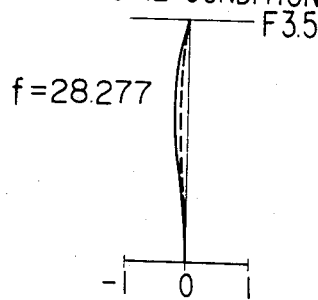
SPHERICAL ABERRATION
— SPHERICAL ABERRATION
--- SINE CONDITION
F3.5
f=28.277

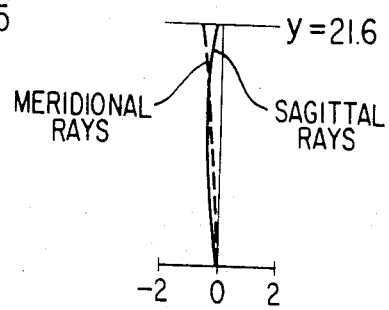
ASTIGMATISM
y=21.6
MERIDIONAL RAYS
SAGITTAL RAYS

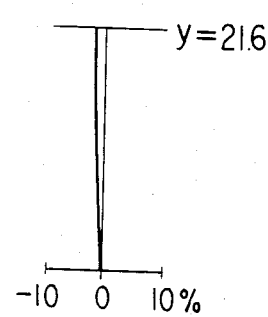
DISTORTION
y=21.6

FIG. 11C

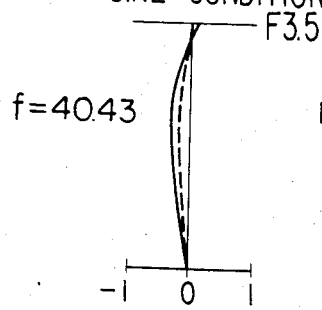
SPHERICAL ABERRATION
— SPHERICAL ABERRATION
--- SINE CONDITION
F3.5
f=40.43

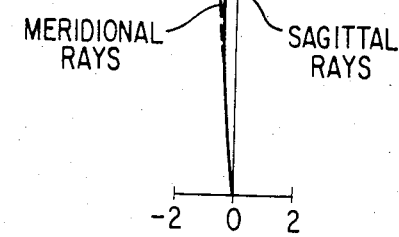
ASTIGMATISM
y=21.6
MERIDIONAL RAYS
SAGITTAL RAYS

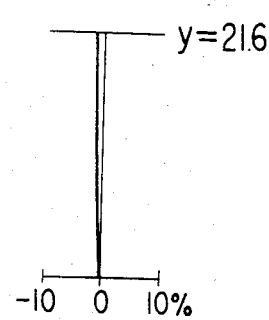
DISTORTION
y=21.6

FIG. 14A

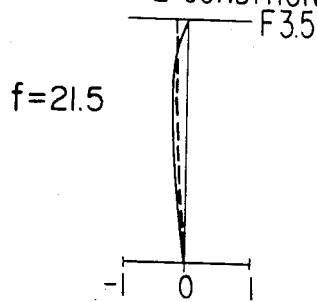
SPHERICAL ABERRATION
— SPHERICAL ABERRATION
--- SINE CONDITION
F3.5
f=21.5

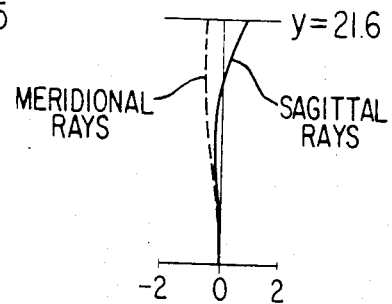
ASTIGMATISM
y=21.6
MERIDIONAL RAYS
SAGITTAL RAYS

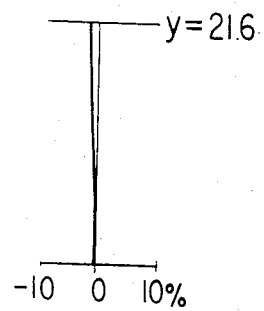
DISTORTION
y=21.6

FIG. 14B

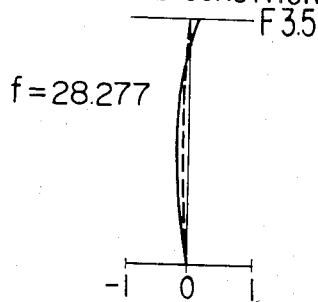
SPHERICAL ABERRATION
— SPHERICAL ABERRATION
--- SINE CONDITION
F3.5
f=28.277

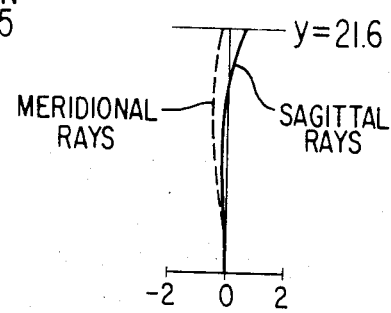
ASTIGMATISM
y=21.6
MERIDIONAL RAYS
SAGITTAL RAYS

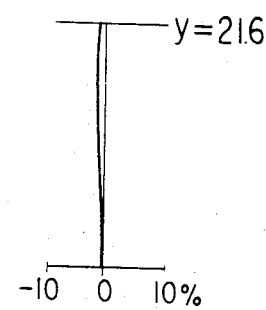
DISTORTION
y=21.6

FIG. 14C

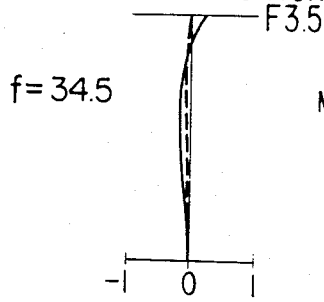
SPHERICAL ABERRATION
— SPHERICAL ABERRATION
--- SINE CONDITION
F3.5
f=34.5

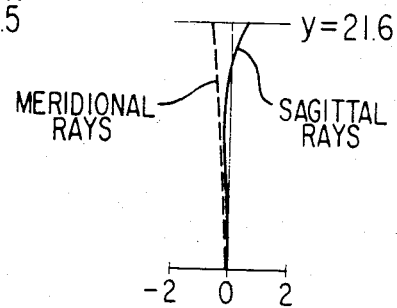
ASTIGMATISM
y=21.6
MERIDIONAL RAYS
SAGITTAL RAYS

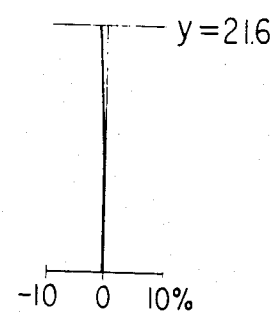
DISTORTION
y=21.6

WIDE ANGLE ZOOM LENS

BACKGROUND OF THE INVENTION

1. Field of the Invention

This invention relates to a wide angle zoom lens of two-group construction, and more particularly to a zoom lens having an angle of view of 90 degrees or greater.

2. Description of the Prior Art

The greatest problem in the designing of a so-called two-group type wide zoom lens comprising negative and positive groups is that aberration correction and compactness are contradictory to each other. This problem sharply increases in difficulty as the angle of view becomes greater, and this is due to the essential property of the two-group zoom system. That is, the two-group zoom lens forms the image from the virtual image by the negative lens group with the magnification by the positive lens group added thereto, but generally, aberration correction is easier as the refractive power of each of these groups is weaker and as the imaging magnification of the positive lens group is smaller. However, this causes bulkiness of the entire system.

Also, in a zoom lens having a great angle of view, the light paths in the respective groups of the light beam concentrating upon a point on the image plane differ greatly from each other due to zooming and therefore, the means for aberration correction at the wide end adversely affects the aberration correction on the telephoto side and accordingly, it is very difficult to correct the aberrations in the entire zoom area equally well.

However, to obtain a compact lens system of excellent performance to overcome these difficulties, according to the conventional technique, an increase in the number of groups moved during zooming, a reduction in the zoom ratio and a reduction in the angle of view have been unavoidable. To maintain an excellent imaging performance, it has been necessary to make the entire lens system bulky and weighty, and such a lens system and has been put into practical use particularly as a large filter-sized zoom lens.

SUMMARY OF THE INVENTION

It is an object of the present invention to provide a compact zoom lens of two-group construction and yet having an angle of view of 90 degrees or greater at the wide angle end and moreover having a zoom ratio of 1.6 or greater.

The invention will become fully apparent from the following detailed description thereof taken in conjunction with the accompanying drawings.

BRIEF DESCRIPTION OF THE DRAWINGS

FIGS. 8A-8C to 14A-14C show the various aberrations in the shortest, intermediate and longest focal length conditions of the first to seventh embodiments.

DESCRIPTION OF THE PREFERRED EMBODIMENTS

Figure 1:
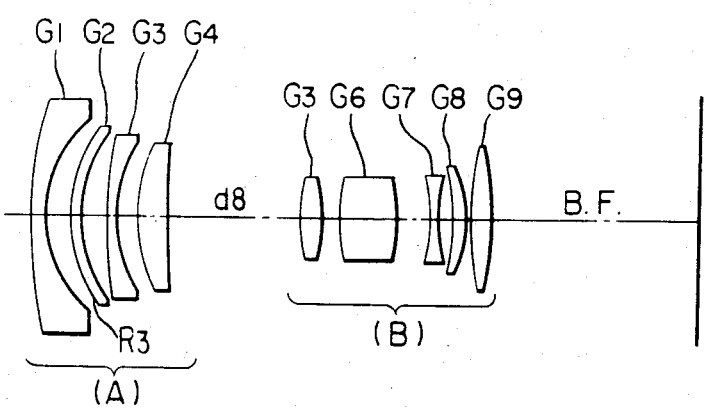
FIGS. 1-7 show the zoom lens arrangements according to first to seventh embodiments of the present invention.

As the result of various trials, the inventor has judged that there is no longer the possibility of compactness in a solution wherein two or more positive lenses exist in the divergent lens group, and has limited the number of positive lenses in the divergent lens group to only one.

Next, in accordance with the conventional common knowledge, the refractive index of the material forming the lens in the divergent lens group has been made high and an attempt to correct the aberrations in the entire lens system by decreasing the amount of aberrations created by individual lenses has been made, with a result that it has been found that, against the conventional common knowledge, remarkable compactness which has never been seen before can be achieved by making the refractive index of at least one lens super-low.

Such a construction can bring about not only the compactness of the lens system but also the use of plastic material, which in turn can bring about various effects attendant on the use of plastic material, such as light weight and low cost of the lens system. As the result of the moldability of plastic material having been considered, making a lens shape in which the difference in thickness between the center and the edge of the lens is small generally makes the molding easier. Where a non-spherical surface is used for the correction of aberrations, a non-spherical configuration in which the thickness of the edge of the lens is small is desirable. Making the edge thickness small directly leads to making the difference in thickness between the center and the edge of the lens small, more particularly in a negative lens of a low-index high-dispersion material.

Thus, the zoom lens according to the present invention is a zoom lens which comprises, in succession from the object side, a divergent lens group and a convergent lens group and in which magnification is changed by relative movement of the two goups and wherein a positive lens and at least one negative lens formed of a low-index high-dispersion material having a refractive index of 1.5 or less and an Abbe number of 62 or less are provided in the divergent lens group.

In the above-described construction of the present invention, where the refractive index of the negative lens exceeds 1.5, correction of negative astigmatism chiefly at the wide angle end becomes difficult and, where the Abbe number of the negative lens exceeds 61, chromatic difference of magnification of g-line in the intermediate portion of the picture plane at the wide angle end becomes significant and in either case, it becomes difficult to maintain the entire lens system compact.

Also, in the zoom lens of the present invention having a high zoom ratio and an angle of view exceeding 90 degrees, the influence of high order aberrations is great and therefore, it is desirable to impose the following conditions:

$$0 < |C_8| < 0.025 fw \times 10^{-7}$$

$$0 < |C_{10}| < 0.05 fw \times 10^{-9}$$

on $C_8$ and $C_{10}$ where the non-spherical surface has been approximated by $$x = \frac{C_0 y^2}{1 + \sqrt{1 - C_0^2 y^2}} + C_4 y^4 + C_6 y^6 + C_8 y^8 + C_{10} y^{10},$$

where y is the distance from the optical axis, x is the distance from the tangential plane of the vertex of the non-spherical surface, $C_0$ is the paraxial curvature at the vertex of the non-spherical surface (the inverse number of the radius of paraxial curvature), $C_4$ to $C_{10}$ are the fourth-order, sixth-order, eigth-order and tenth-order non-spherical coefficients, and fw is the focal length of the lens system at the wide angle end thereof.

If $C_8$ and $C_{10}$ are 0, astigmatism will occur particularly at the wide angle end and it will become difficult to correct distortion and astigmatism at the same time. Also, if the amount of non-sphericity by $C_8$ and $C_{10}$ is made great, the edge thickness of the lens will become insufficient and it will become difficult to secure a sufficient effective diameter or the marginal edge thickness of the air lens adjacent to the non-spherical surface will become deficient and there will be an undesirable possibility that the spherical surface and the lens surface opposed thereto are in contact with each other in the marginal edge portion.

It is desirable that the divergent lens group have at least two negative meniscus lenses having their convex surfaces facing the object side and at least one positive lens, and it is effective that the non-spherical surface as described above is formed in the second negative meniscus lens from the object side. In this case, it is desirable that the non-spherical surface be the surface of the negative meniscus lens which is adjacent to the object side. When the refractive power of the second negative meniscus lens is $P_2$ and the refractive power of the divergent lens group is Pa, it is advantageous to the manufacture of the non-spherical surface to satisfy $$0.02 < P_2/Pa < 0.7$$

and further, if this upper limit value is 0.5 or less, the imaging performance can be more stable.

On the other hand, it is desirable that the convergent lens group have, in succession from the object side, at least two positive lenses, a negative lens and at least one positive lens. Of course, each lens may be provided with a cemented surface to correct the various aberrations better.

Examples of the various lens types provided by the present invention will be shown hereinafter.

In a first embodiment, as shown in FIG. 1, a divergent lens group A has, in succession from the object side, three negative meniscus lenses $G_1$, $G_2$ and $G_3$ having their convex surfaces facing the object side and a positive lens $G_4$, and a convergent lens group B has, in succession from the object side, a positive lens $G_5$, a positive lens $G_6$ having a greater center thickness than that of the positive lens $G_5$, a biconcave negative lens $G_7$, a positive meniscus lens $G_8$ having its convex surface facing the image side, and a biconvex positive lens $G_9$, and this embodiment is a compact zoom lens which is of only nine-group two-lens construction as the entire system and yet in which when the focal length f=21.5 mm–34.5 mm and the zoom ratio is 1.6, even if a filter of diameter 48 mm is mounted on the object side of the lens system, no vignetting is created, that is, a deficiency of quantity of light is not caused in the marginal portion of the picture plane. In the present embodiment, the characteristic low-index high-dispersion material of the present invention is used for the second negative meniscus lens $G_2$ in the divergent lens group A from the object side and the surface $R_3$ thereof which is adjacent to the object side is made into a non-spherical surface. In the zoom lens comprising the lens arrangement of the present embodiment, when the refractive powers (given by the inverse number of the focal length) of the successive lenses from the object side are $P_1$, $P_2$, $P_3$, ... and the refractive power of the divergent lens group is Pa and the refractive power of the convergent lens group is Pb, it is desirable to construct each lens on the following conditions. (This also holds true of the following embodiments.)

| Power Distribution in the First Embodiment |
| --- |
| $0.9 \|Pa\| < \|P_1\| < \|Pa\|, P_1 < 0$ |
| $0.02 \|Pa\| < \|P_2\| < 0.6 \|Pa\|, P_2 < 0$ |
| $0.4 \|Pa\| < \|P_3\| < 0.9 \|Pa\|, P_3 < 0$ |
| $0.65 \|Pa\| < P_4 < 0.85 \|Pa\|$ |
| $0.3 \ Pb < P_5 < 0.5 \ Pb$ |
| $0.7 \ Pb < P_6 < 0.9 \ Pb$ |
| $1.6 \ Pb < \|P_7\| < 2.4 \ Pb, P_7 < 0$ |
| $0.5 \ Pb < P_8 < 1.6 \ Pb$ |
| $0.4 \ Pb < P_9 < 0.9 \ Pb$ |

The numerical data of the optimum solution in such a power arrangement will be shown in the table below. In the table, the numbers at the left end indicate the order from the object side, R represents the radius of curvature of each lens surface, D represents the center thickness and air space of each lens, and nd and νd represent the refractive index and the Abbe number, respectively, of each lens for d-line. (This also holds true of the following embodiments.)

First Embodiment
f = 21.5~34.5  F-number 3.5

| | R | D | nd | νd | |
| --- | --- | --- | --- | --- | --- |
| 1 | 84.542 | 2.40 | 1.79668 | 45.5 | $G_1$ |
| 2 | 19.410 | 4.35 | | | |
| 3 | 29.211(*) | 2.00 | 1.49823 | 59.2 | $G_2$ |
| 4 | 23.432 | 4.00 | | | |
| 5 | 50.770 | 2.00 | 1.79668 | 45.5 | $G_3$ |
| 6 | 22.769 | 4.02 | | | |
| 7 | 31.521 | 5.00 | 1.72825 | 28.3 | $G_4$ |
| 8 | 422.700 | $d_8$ (variable) | | | |
| 9 | 83.264 | 3.50 | 1.67025 | 57.6 | $G_5$ |
| 10 | −127.798 | 1.00 | | | |
| 11 | .000 | 2.00 | | | |
| 12 | 22.500 | 10.00 | 1.48749 | 70.2 | $G_6$ |
| 13 | −194.056 | 6.00 | | | |
| 14 | −24.176 | 1.50 | 1.79504 | 28.6 | $G_7$ |
| 15 | 35.085 | 2.00 | | | |
| 16 | −131.908 | 3.50 | 1.50137 | 56.5 | $G_8$ |
| 17 | −16.629 | .40 | | | |
| 18 | 67.766 | 3.00 | 1.51680 | 64.1 | $G_9$ |
| 19 | −45.769 | B.F | | | |

Group A: $G_1$–$G_4$; Group B: $G_5$–$G_9$

Pa = −0.029     (*)Non-spherical surface coefficient
Pb = 0.028      $C_4 = 1.947 \times 10^{-5}$
$P_1$ = −0.031    $C_6 = 2.18 \times 10^{-8}$
$P_2$ = −0.0041   $C_8 = 6.129 \times 10^{-11}$
$P_3$ = −0.019    $C_{10} = 4.3 \times 10^{-13}$
$P_4$ = 0.021     $d_8 = 22.84 \sim 0.84$
$P_5$ = 0.013     B.F = 36.63~49.99
$P_6$ = 0.024
$P_7$ = −0.056
$P_8$ = 0.027
$P_9$ = 0.019

Figure 2:
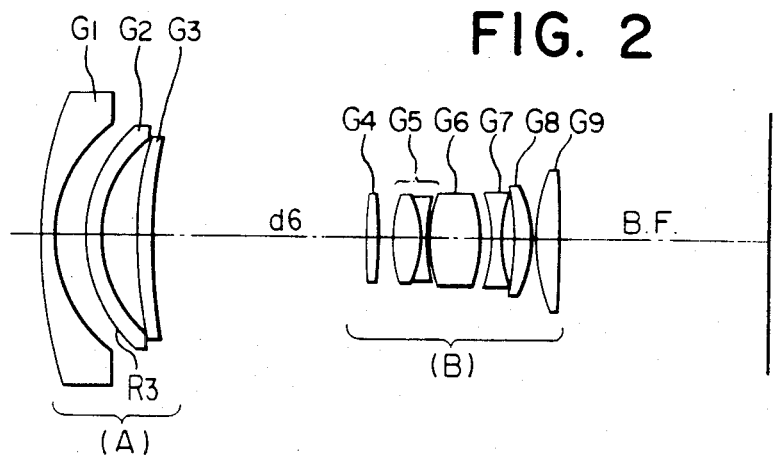

In a second embodiment of the present invention, as shown in FIG. 2, a divergent lens group A has, in succession from the object side, two negative meniscus lenses $G_1$ and $G_2$ having their convex surfaces facing the object side and a positive meniscus lens $G_3$ having its convex surface facing the object side, and a convergent lens group B has, in succession from the object side, a positive lens $G_4$, a negative meniscus lens $G_5$ comprising a cemented lens and having its convex surface facing the object side, a biconvex positive lens $G_6$, a biconcave negative lens $G_7$, a positive meniscus lens $G_8$ having its convex surface facing the image side, and a positive lens $G_9$. Where the divergent lens group A is so formed by three negative, negative and positive lenses, the maximum angle of view of the order of 64 degrees has been the limit in the past. Again, by making the second negative meniscus lens of a low-index high-dispersion material and making its surface $R_3$ which is adjacent to the object side into a non-spherical surface, it is possible to include an angle of view of 90 degrees at the wide angle end. In the zoom lens comprising such type of construction, it is desirable that the refractive power of each lens be in the following range.

Power Distribution in the Second Embodiment

| | | | |
|---|---|---|---|
| 0.4 $|Pa|$ | < $|P_1|$ | < 1.1 | $|Pa|$, $P_1 < 0$ |
| 0.04 $|Pa|$ | < $|P_2|$ | < 0.7 | $|Pa|$, $P_2 < 0$ |
| 0.05 $|Pa|$ | < $P_3$ | < 0.6 | $|Pa|$ |
| 0.4 Pb | < $P_4$ | < 0.9 | Pb |
| −0.5 Pb | < $P_5$ | < 0.2 | Pb |
| 1.1 Pb | < $P_6$ | < 1.9 | Pb |
| 1.7 Pb | < $|P_7|$ | < 2.6 | Pb, $P_7 < 0$ |
| 0.4 Pb | < $P_8$ | < 0.95 | Pb |
| 0.35 Pb | < $P_9$ | < 0.8 | Pb |

The numerical data of the optimum solution of the second embodiment will be shown in the table below.

Second Embodiment
f = 21.5~34.5   F-number 3.5

| | R | D | nd | νd | |
|---|---|---|---|---|---|
| 1 | 64.919 | 2.40 | 1.78797 | 47.5 | $G_1$ |
| 2 | 20.920 | 6.00 | | | |
| 3 | 33.477(*) | 2.00 | 1.49108 | 57.6 | $G_2$ |
| 4 | 20.822 | 6.00 | | | |
| 5 | 54.472 | 3.00 | 1.72825 | 28.3 | $G_3$ |
| 6 | 88.146 | $d_6$ (variable) | | | |
| 7 | 66.935 | 1.80 | 1.67270 | 57.6 | $G_4$ |
| 8 | −90.139 | 1.00 | | | |
| 9 | .000 | 2.00 | | | |
| 10 | 29.859 | 4.50 | 1.62588 | 35.6 | $G_5$ |
| 11 | −17.539 | 1.00 | 1.79668 | 45.5 | |
| 12 | 34.344 | .10 | | | |
| 13 | 22.330 | 9.50 | 1.54739 | 53.6 | $G_6$ |
| 14 | −25.976 | 2.00 | | | |
| 15 | −33.725 | 1.50 | 1.80518 | 25.4 | $G_7$ |
| 16 | 23.194 | 2.00 | | | |
| 17 | −53.782 | 3.50 | 1.50137 | 56.5 | $G_8$ |
| 18 | −18.255 | .40 | | | |
| 19 | 35.814 | 3.50 | 1.51860 | 70.1 | $G_9$ |
| 20 | −700.199 | B.F | | | |

Pa = −0.029     (*)Non-spherical surface coefficient
Pb = 0.028       $C_4 = 1.7 \times 10^{-5}$
$P_1$ = −0.025   $C_6 = -4.521 \times 10^{-10}$
$P_2$ = 0.008    $C_8 = -3.719 \times 10^{-14}$
$P_3$ = 0.005    $C_{10} = 3.4 \times 10^{-13}$
$P_4$ = 0.017    $d_6 = 37.28\sim15.27$
$P_5$ = −0.010   B.F = 36.76~50.11
$P_6$ = 0.042
$P_7$ = −0.059
$P_8$ = 0.019
$P_9$ = 0.015

Figure 3:
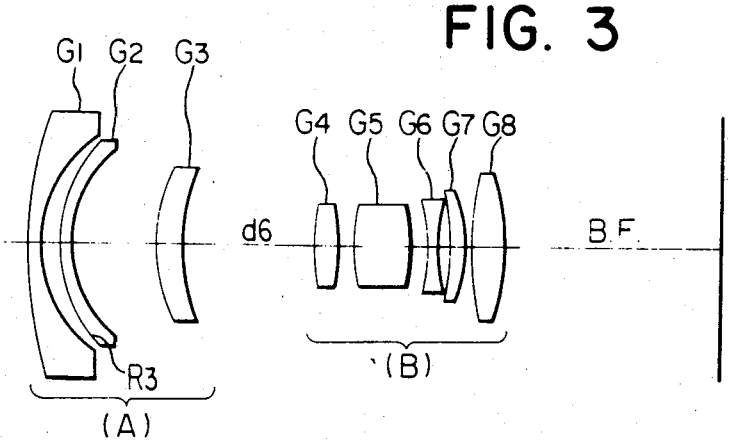

In a third embodiment, as shown in FIG. 3, a divergent lens group A comprises three lenses as in the second embodiment, and the second negative meniscus lens $G_2$ is formed of a low-index high-dispersion material and its surface $R_3$ which is adjacent to the object side is made into a non-spherical surface as in the second embodiment, but it is characteristic that the air space between the negative meniscus lens $G_2$ and the positive meniscus lens $G_3$ is greater than twice the center thickness of the positive meniscus lens $G_3$. A convergent lens group B is of a construction substantially similar to that of the first embodiment and the entire system is of a simple eight-group eight-lens construction. Again in this embodiment, it is possible to cover the maximum angle of view of 90 degrees which is much greater than the conventional 64 degrees. In the construction of the third embodiment, the desirable power distribution for each lens is as follows:

Power Distribution in the Third Embodiment

| | | | |
|---|---|---|---|
| 0.9 $|Pa|$ | < $|P_1|$ | < 0.98 | $|Pa|$, $P_1 < 0$ |
| 0.3 $|Pa|$ | < $|P_2|$ | < 0.5 | $|Pa|$, $P_2 < 0$ |
| 0.2 $|Pa|$ | < $P_3$ | < 0.35 | $|Pa|$ |
| 0.3 Pb | < $P_4$ | < 1.3 | Pb |
| 0.7 Pb | < $P_5$ | < 1.2 | Pb |
| 1.8 Pb | < $|P_6|$ | < 2.3 | Pb, $P_6 < 0$ |
| 0.5 Pb | < $P_7$ | < 0.9 | Pb |
| 0.5 Pb | < $P_8$ | < 0.9 | Pb |

The optimum numerical data of the third embodiment will be shown below.

Third Embodiment
f = 21.5~34.5   F-number 3.5

| | R | D | nd | νd | |
|---|---|---|---|---|---|
| 1 | 67.667 | 2.40 | 1.78797 | 47.5 | $G_1$ |
| 2 | 19.923 | 3.00 | | | |
| 3 | 32.887(*) | 2.00 | 1.49108 | 57.6 | $G_2$ |
| 4 | 19.102 | 14.95 | | | |
| 5 | 30.337 | 5.00 | 1.72825 | 28.3 | $G_3$ |
| 6 | 41.162 | $d_6$ (variable) | | | |
| 7 | 66.543 | 3.50 | 1.67270 | 32.2 | $G_4$ |
| 8 | −152.688 | 1.00 | | | |
| 9 | .000 | 2.00 | | | |
| 10 | 19.809 | 10.00 | 1.48749 | 70.2 | $G_5$ |
| 11 | −125.581 | 3.16 | | | |
| 12 | −22.325 | 1.50 | 1.79504 | 28.6 | $G_6$ |
| 13 | 31.687 | 2.00 | | | |
| 14 | −48.870 | 3.50 | 1.50137 | 56.5 | $G_7$ |
| 15 | −15.939 | .40 | | | |
| 16 | 67.545 | 5.00 | 1.51860 | 70.1 | $G_8$ |
| 17 | −37.800 | B.F | | | |

Pa = −0.029     (*)Non-spherical surface coefficient
Pb = 0.028       $C_4 = 2.14 \times 10^{-5}$
$P_1$ = −0.027   $C_6 = 1.23 \times 10^{-8}$
$P_2$ = −0.010   $C_8 = -5.72 \times 10^{-11}$
$P_3$ = 0.008    $C_{10} = 5.823 \times 10^{-13}$
$P_4$ = 0.014    $d_6 = 22.6\sim0.6$
$P_5$ = 0.028    B.F = 38.06~51.4
$P_6$ = −0.061
$P_7$ = 0.022
$P_8$ = 0.021

Figure 4:
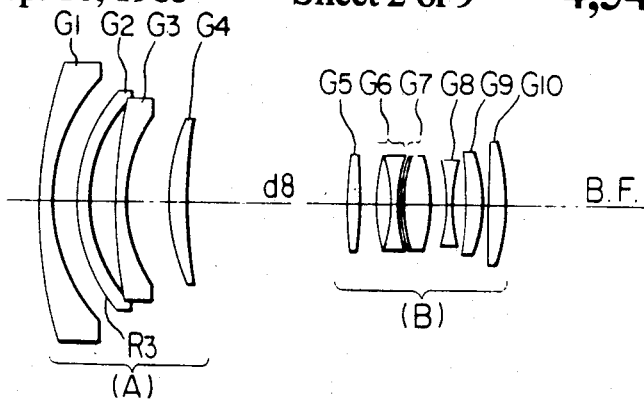

In a fourth embodiment of the present invention as shown in FIG. 4, a divergent lens group A is substantially similar in construction to that of the first embodiment but the only positive lens $G_4$ is a positive meniscus lens sharply bent toward the object side. A convergent lens group B is substantially similar to that of the second embodiment, but the biconvex positive lens $G_7$ is provided with a cemented surface. Again in this embodiment, the second negative meniscus lens $G_2$ is formed of a low-index high-dispersion material and its surface $R_3$ which is adjacent to the object side is a non-spherical surface. By such construction, the present embodiment has a maximum angle of view of 92 degrees and yet its zoom ratio amounts to 1.9. In such construction, the appropriate power distribution of each lens is as follows:

| Power Distribution in the Fourth Embodiment |
|---|
| $0.3 \|P_a\| < \|P_1\| < 1.2 \|P_a\|, P_1 < 0$ |
| $0.02 \|P_a\| < \|P_2\| < 0.9 \|P_a\|, P_2 < 0$ |
| $0.3 \|P_a\| < \|P_3\| < 0.9 \|P_a\|, P_3 < 0$ |
| $0.2 \|P_a\| < P_4 < 0.8 \|P_a\|$ |
| $0.3\ P_b < P_5 < 1.3\ P_b$ |
| $-0.5\ P_b < P_6 < 0.5\ P_b$ |
| $0.7\ P_b < P_7 < 1.4\ P_b$ |
| $1.4\ P_b < \|P_8\| < 2.2\ P_b, P_8 < 0$ |
| $0.3\ P_b < P_9 < 1.0\ P_b$ |
| $0.3\ P_b < P_{10} < 0.8\ P_b$ |

The numerical data of the optimum solution of the present embodiment are as shown below.

Fourth Embodiment
$f = 21.5 \sim 40.43$  F-number $3.5 \sim 4.5$

| | R | D | nd | vd | |
|---|---|---|---|---|---|
| 1 | 64.000 | 2.40 | 1.78797 | 47.5 | $G_1$ |
| 2 | 25.000 | 4.35 | | | |
| 3 | 32.377(*) | 2.00 | 1.49823 | 59.2 | $G_2$ |
| 4 | 20.597 | 4.00 | | | |
| 5 | 52.000 | 2.00 | 1.78797 | 47.5 | $G_3$ |
| 6 | 23.391 | 8.00 | | | |
| 7 | 30.761 | 3.00 | 1.72825 | 28.3 | $G_4$ |
| 8 | 73.742 | $d_8$ (variable) | | | |
| 9 | 66.015 | 1.80 | 1.66446 | 35.9 | $G_5$ |
| 10 | −83.552 | 1.00 | | | |
| 11 | .000 | 2.00 | | | |
| 12 | 28.422 | 3.00 | 1.62230 | 53.1 | $G_6$ |
| 13 | −19.165 | 1.00 | 1.79668 | 45.5 | |
| 14 | 33.767 | .10 | | | |
| 15 | 21.715 | 1.00 | 1.54739 | 53.6 | $G_7$ |
| 16 | 16.010 | 4.00 | 1.54814 | 45.9 | |
| 17 | −52.192 | 3.10 | | | |
| 18 | −41.838 | 1.50 | 1.80518 | 25.4 | $G_8$ |
| 19 | 25.090 | 2.00 | | | |
| 20 | −49.505 | 3.50 | 1.50137 | 56.5 | $G_9$ |
| 21 | −18.307 | .40 | | | |
| 22 | 323.983 | 2.80 | 1.51835 | 60.3 | $G_{10}$ |
| 23 | −32.421 | B.F | | | |

Groups A (surfaces 1–8) and B (surfaces 9–23).

Figure 5:
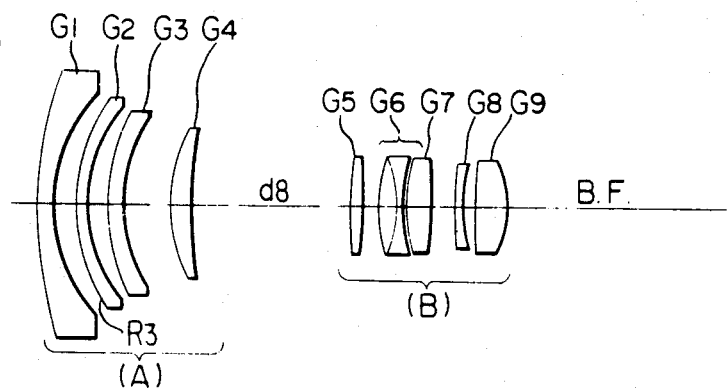

$P_a = -0.029$  (*)Non-spherical surface coefficient
$P_b = 0.028$   $C_4 = 1.365 \times 10^{-5}$
$P_1 = -0.019$  $C_6 = 1.277 \times 10^{-9}$
$P_2 = -0.008$  $C_8 = 4.86 \times 10^{-11}$
$P_3 = -0.018$  $C_{10} = 7 \times 10^{-14}$
$P_4 = 0.014$   $d_8 = 27.79 \sim 0.45$
$P_5 = 0.018$   $B.F = 41.11 \sim 60.55$
$P_6 = -0.009$
$P_7 = 0.035$
$P_8 = -0.052$
$P_9 = 0.018$
$P_{10} = 0.018$ In a fifth embodiment of the present invention shown in FIG. 5, a divergent lens group A is substantially similar in construction to that of the first embodiment, while a convergent lens group B has, in succession from the object side, a biconvex positive lens $G_5$, a negative meniscus lens $G_6$ comprising a cemented lens and having its convex surface facing the object side, a positive lens $G_7$, a negative lens $G_8$ having its concave surface of sharper curvature facing the image side, and a positive lens $G_9$ having its convex surface of sharper curvature facing the image side. The second negative meniscus lens $G_2$ in the divergent lens group is formed of a low-index high-dispersion material and its surface $R_3$ which is adjacent to the object side is formed into a non-spherical surface. Again in such construction, the maximum angle of view is 92 degrees and the zoom ratio amounts to 1.9, and the desirable power distribution for each lens is as follows:

| Power Distribution in the Fifth Embodiment |
|---|
| $0.3 \|P_a\| < \|P_1\| < 0.9 \|P_a\|, P_1 < 0$ |
| $0.1 \|P_a\| < \|P_2\| < 0.8 \|P_a\|, P_2 < 0$ |
| $0.2 \|P_a\| < \|P_3\| < 0.8 \|P_a\|, P_3 < 0$ |
| $0.3 \|P_a\| < P_4 < 0.7 \|P_a\|$ |
| $0.4\ P_b < P_5 < 1.1\ P_b$ |
| $-0.4\ P_b < P_6 < 0.4\ P_b$ |
| $0.3\ P_b < P_7 < 1.2\ P_b$ |
| $0.7\ P_b < P_8 < 1.9\ P_b$ |
| $0.7\ P_b < P_9 < 1.6\ P_b$ |

The numerical data of the optimum solution of the fifth embodiment are as follows:

Fifth Embodiment
$f = 21.5 \sim 40.43$  F-number $3.5 \sim 4.5$

| | R | D | nd | vd | |
|---|---|---|---|---|---|
| 1 | 64.249 | 2.40 | 1.78797 | 47.5 | $G_1$ |
| 2 | 23.675 | 4.35 | | | |
| 3 | 44.977(*) | 2.00 | 1.49823 | 59.2 | $G_2$ |
| 4 | 22.143 | 4.00 | | | |
| 5 | 38.293 | 2.00 | 1.78797 | 47.5 | $G_3$ |
| 6 | 23.472 | 8.85 | | | |
| 7 | 30.745 | 3.00 | 1.72825 | 28.3 | $G_4$ |
| 8 | 64.848 | $d_8$ (variable) | | | |
| 9 | 82.520 | 1.80 | 1.67270 | 32.2 | $G_5$ |
| 10 | −82.687 | 1.00 | | | |
| 11 | .000 | 2.00 | | | |
| 12 | 27.869 | 3.00 | 1.62230 | 53.1 | $G_6$ |
| 13 | −20.530 | 1.00 | 1.79631 | 41.0 | |
| 14 | 39.101 | .10 | | | |
| 15 | 27.071 | 5.00 | 1.54739 | 53.6 | $G_7$ |
| 16 | −285.620 | 4.17 | | | |
| 17 | 125.878 | 1.50 | 1.80518 | 25.4 | $G_8$ |
| 18 | 21.151 | 2.00 | | | |
| 19 | 186.118 | 5.00 | 1.62041 | 60.3 | $G_9$ |
| 20 | −24.269 | B.F | | | |

Figure 6:
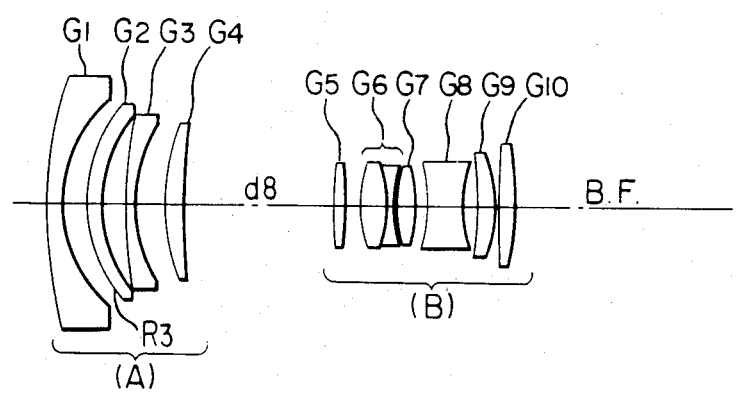
Figure 7:
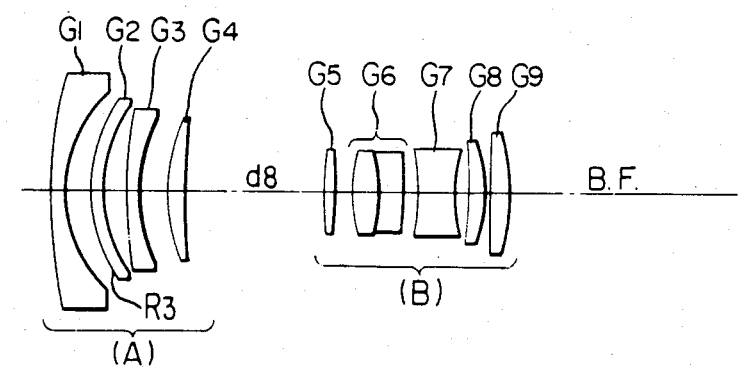
Figure 8A:
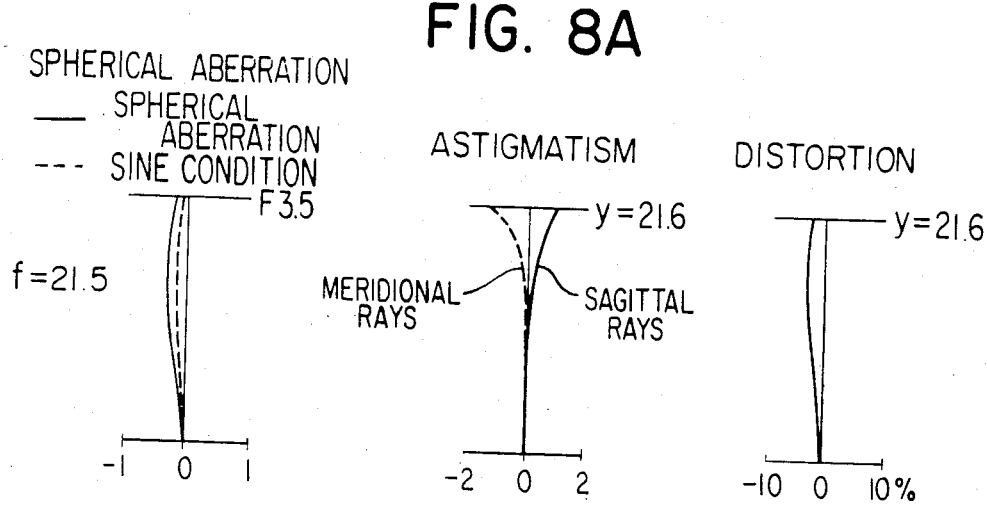
Figure 8B:
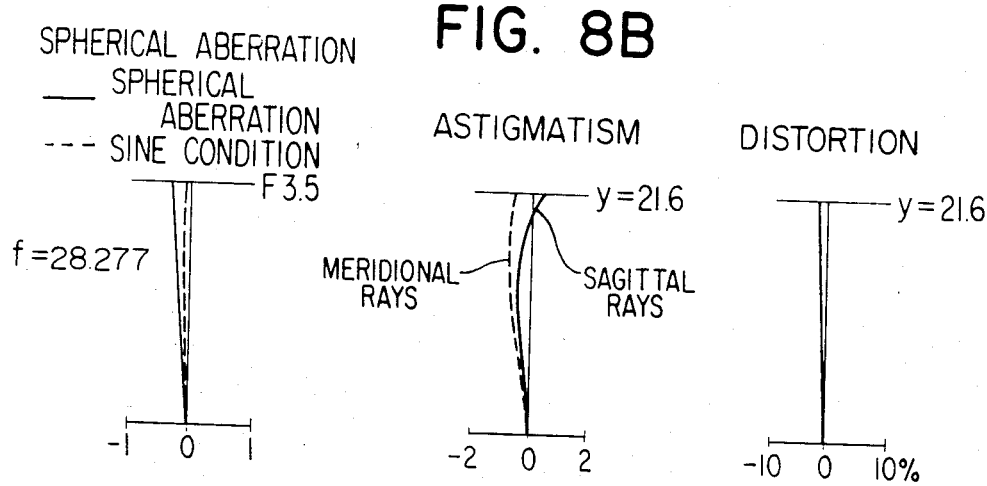
Figure 8C:
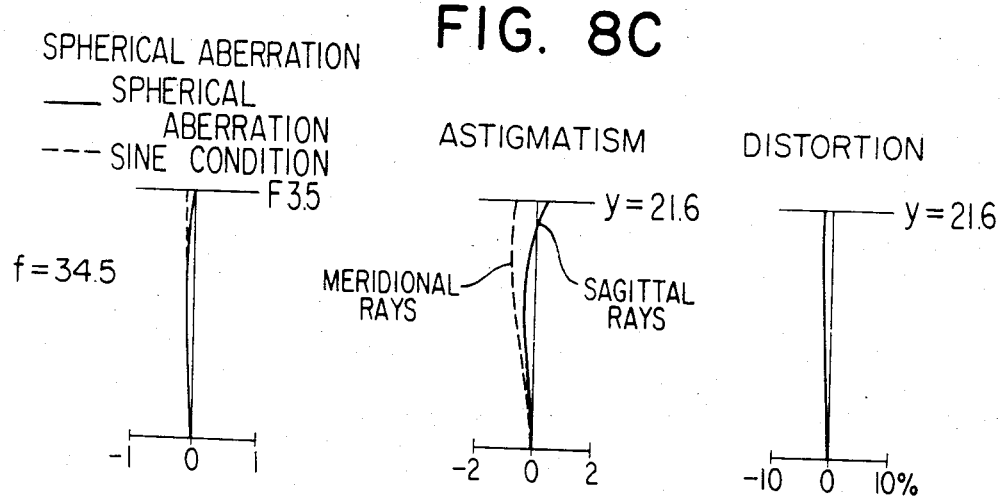
Figure 12A:
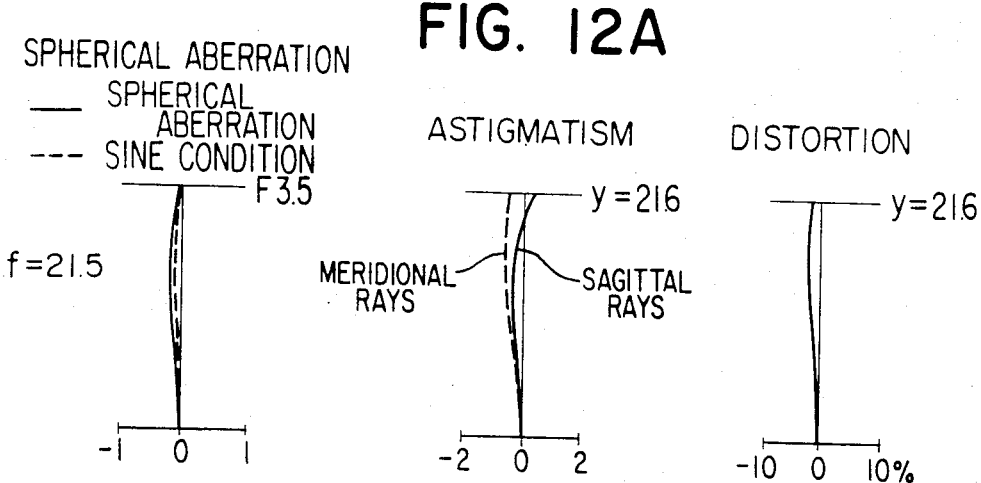
Figure 12B:
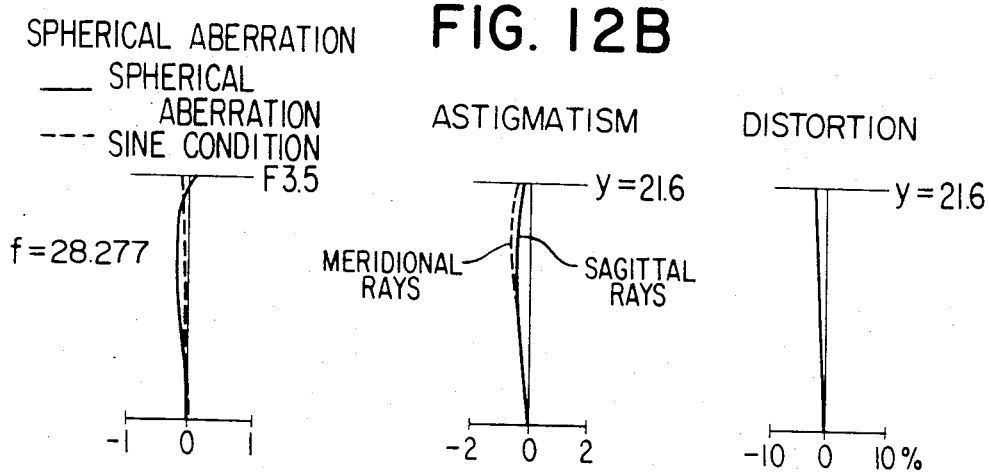
Figure 12C:
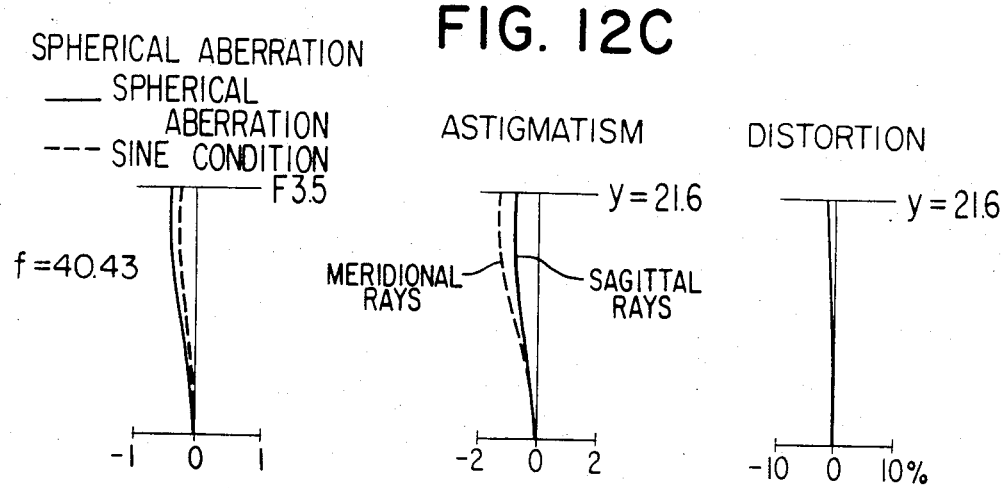
Figure 13A:
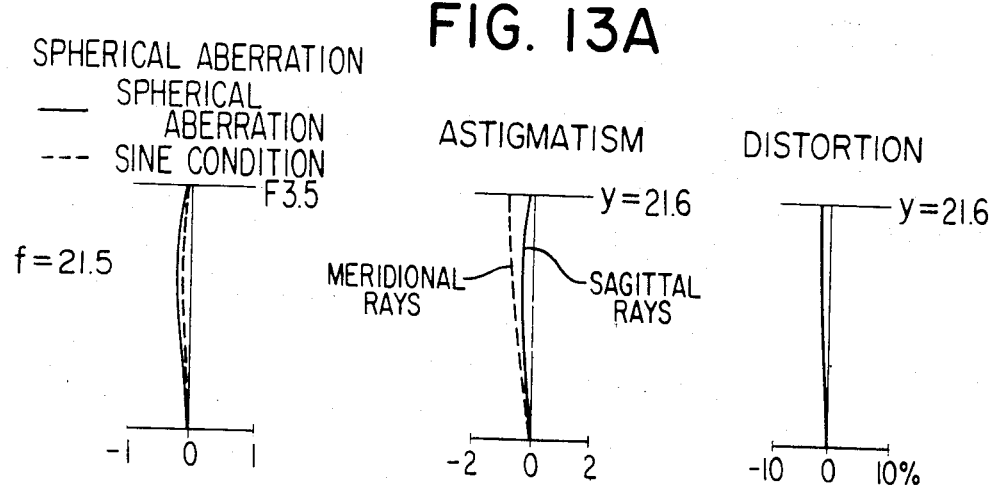
Figure 13B:
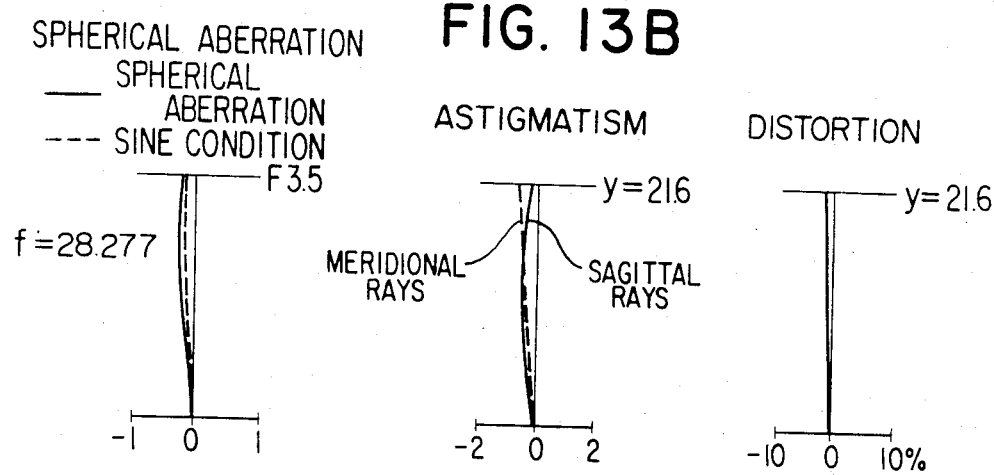
Figure 13C:
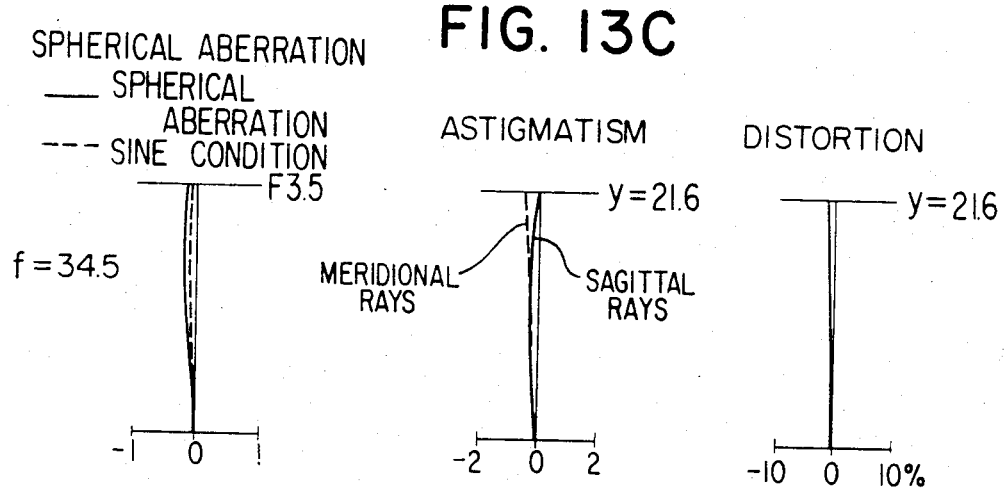

$P_a = -0.029$  (*)Non-spherical surface coefficient
$P_b = 0.028$   $C_4 = 1.345 \times 10^{-5}$
$P_1 = -0.020$  $C_6 = 2.447 \times 10^{-9}$
$P_2 = -0.011$  $C_8 = 3.162 \times 10^{-11}$
$P_3 = -0.012$  $C_{10} = 3.393 \times 10^{-14}$
$P_4 = 0.013$   $d_8 = 28.13 \sim 0.79$
$P_5 = 0.016$   $B.F = 41.18 \sim 60.62$
$P_6 = -0.005$
$P_7 = 0.022$
$P_8 = -0.031$
$P_9 = 0.029$ In a sixth and a seventh embodiments of the present invention, as shown in FIGS. 6 and 7, respectively, a divergent lens group A is substantially similar in construction to that of the first embodiment. The convergent lens group of the sixth embodiment is similar in construction to that of the second embodiment, while in the convergent lens group of the seventh embodiment, the biconvex positive lens positioned before the biconcave lens is absent and the rearmost positive lens $G_9$ is a positive meniscus lens bent toward the image side. In both of these two embodiments, the second negative meniscus lens $G_2$ in the divergent lens group is formed of a low-index high-dispersion material and its surface $R_3$ which is adjacent to the object side is a non-spherical surface. The desirable power distribution of each lens in the constructions of the sixth and seventh embodiments will be shown below.

Power Distribution in the Sixth Embodiment $0.5 \ |Pa| < |P_1| < 1.5 \ |Pa|, P_1 < 0$
$0.02 \ |Pa| < |P_2| < 0.5 \ |Pa|, P_2 < 0$
$0.3 \ |Pa| < |P_3| < 0.9 \ |Pa|, P_3 < 0$
$0.3 \ |Pa| < P_4 < 0.9 \ |Pa|$
$0.4 \ Pb < P_5 < 1.2 \ Pb$
$-0.6 \ Pb < P_6 < 0.6 \ Pb$
$0.7 \ Pb < P_7 < 1.5 \ Pb$
$1.1 \ Pb < |P_8| < 2.4 \ Pb, P_8 < 0$
$0.3 \ Pb < P_9 < 1.1 \ Pb$
$0.4 \ Pb < P_{10} < 1.1 \ Pb$ Power Distribution in the Seventh Embodiment $0.4 \ |Pa| < |P_1| < 1.3 \ |Pa|, P_1 < 0$
$0.1 \ |Pa| < |P_2| < 0.5 \ |Pa|, P_2 < 0$
$0.3 \ |Pa| < |P_3| < 0.9 \ |Pa|, P_3 < 0$
$0.45 \ |Pa| < P_4 < 0.95 \ |Pa|$
$0.3 \ Pb < P_5 < 0.9 \ Pb$
$0.4 \ Pb < P_6 < 1.3 \ Pb$
$1.0 \ Pb < |P_7| < 2.3 \ Pb, P_7 < 0$
$0.4 \ Pb < P_8 < 1.2 \ Pb$
$0.4 \ Pb < P_9 < 1.2 \ Pb$ The numerical data of the optimum solutions of these embodiments are as shown below.

Sixth Embodiment
f = 21.5~34.5  F-number 3.5

| | R | D | nd | νd | | |
|---|---|---|---|---|---|---|
| 1 | 76.298 | 2.40 | 1.79668 | 45.5 | $G_1$ | |
| 2 | 20.705 | 4.35 | | | | |
| 3 | 31.590(*) | 2.00 | 1.49823 | 59.2 | $G_2$ | |
| 4 | 21.102 | 4.00 | | | | A |
| 5 | 48.496 | 2.00 | 1.79668 | 45.5 | $G_3$ | |
| 6 | 24.910 | 5.58 | | | | |
| 7 | 30.883 | 3.00 | 1.72825 | 28.3 | $G_4$ | |
| 8 | 124.590 | $d_8$ (variable) | | | | |
| 9 | 63.647 | 1.80 | 1.67270 | 32.2 | $G_5$ | |
| 10 | −84.941 | 1.00 | | | | |
| 11 | .000 | 2.00 | | | | |
| 12 | 28.866 | 4.50 | 1.62230 | 53.1 | $G_6$ | |
| 13 | −18.391 | 1.00 | 1.79668 | 45.5 | | |
| 14 | 33.240 | .10 | | | | B |
| 15 | 24.396 | 3.50 | 1.54739 | 53.6 | $G_7$ | |
| 16 | −38.669 | 1.78 | | | | |
| 17 | −44.091 | 7.00 | 1.80518 | 25.4 | $G_8$ | |
| 18 | 26.739 | 2.00 | | | | |
| 19 | −69.572 | 3.50 | 1.50137 | 56.5 | $G_9$ | |
| 20 | −19.213 | .40 | | | | |
| 21 | 183.998 | 2.80 | 1.62041 | 60.3 | $G_{10}$ | |
| 22 | −53.387 | B.F | | | | |

$Pa = -0.029$    (*)Non-spherical surface coefficient
$Pb = 0.028$    $C_4 = 1.956 \times 10^{-5}$
$P_1 = -0.027$    $C_6 = 1.5 \times 10^{-8}$
$P_2 = -0.007$    $C_8 = 2.614 \times 10^{-11}$
$P_3 = -0.015$    $C_{10} = 2.83 \times 10^{-13}$
$P_4 = 0.018$    $d_8 = 26.53 \sim 4.52$
$P_5 = 0.018$    $B.F = 39.3 \sim 52.65$
$P_6 = -0.010$
$P_7 = 0.036$
$P_8 = -0.051$
$P_9 = 0.019$
$P_{10} = 0.015$ Seventh Embodiment
f = 21.5~34.5  F-number 3.5

| | R | D | nd | νd | | |
|---|---|---|---|---|---|---|
| 1 | 84.326 | 2.40 | 1.79668 | 45.5 | $G_1$ | |
| 2 | 20.368 | 4.35 | | | | |
| 3 | 31.281(*) | 2.00 | 1.49823 | 59.2 | $G_2$ | |
| 4 | 21.508 | 4.00 | | | | A |
| 5 | 61.688 | 2.00 | 1.79668 | 45.5 | $G_3$ | |
| 6 | 26.543 | 5.64 | | | | |
| 7 | 33.660 | 3.00 | 1.72825 | 28.3 | $G_4$ | |
| 8 | 312.886 | $d_8$ (variable) | | | | |
| 9 | 64.509 | 1.80 | 1.67270 | 32.2 | $G_5$ | |
| 10 | −92.241 | 1.00 | | | | |
| 11 | .000 | 2.00 | | | | |
| 12 | 29.037 | 4.50 | 1.62230 | 53.1 | $G_6$ | |
| 13 | −19.720 | 4.50 | 1.79886 | 34.0 | | B |
| 14 | −61.925 | 2.11 | | | | |
| 15 | −44.877 | 7.00 | 1.80518 | 25.4 | $G_7$ | |
| 16 | 27.045 | 2.00 | | | | |
| 17 | −62.708 | 3.50 | 1.50137 | 56.5 | $G_8$ | |
| 18 | −20.201 | .40 | | | | |
| 19 | −135.756 | 2.80 | 1.62299 | 58.2 | $G_9$ | |
| 20 | −29.338 | B.F | | | | |

$Pa = -0.029$    (*)Non-spherical surface coefficient
$Pb = 0.028$    $C_4 = 2.088 \times 10^{-5}$
$P_1 = -0.029$    $C_6 = 1.798 \times 10^{-8}$
$P_2 = -0.007$    $C_8 = 3.644 \times 10^{-11}$
$P_3 = -0.017$    $C_{10} = 2.63 \times 10^{-13}$
$P_4 = 0.019$    $d_8 = 23.84 \sim 1.84$
$P_5 = 0.018$    $B.F = 39.54 \sim 52.89$
$P_6 = 0.025$
$P_7 = -0.050$
$P_8 = 0.017$
$P_9 = 0.017$ In each of the above-described embodiments, a low-index high-dispersion material is used for the second negative meniscus lens in the divergent lens group and a non-spherical surface is provided in the surface thereof which is adjacent to the object side. The low-index high-dispersion material is a plastic, and in each of the above-described embodiments, use is made of methacrylic resin (refractive index nd=1.49108, Abbe number νd=57.6) or polyallyl diglycol carbonate resin (refractive index nd=1.49823, Abbe number νd=59.2) known as CR-39 (trademark). Other materials may also be used as the low-index high-dispersion material and in the present invention, a refractive index of 1.45 or higher and an Abbe number of 50 or greater are practical. The value of the optical constant is the value at a normal temperature of 20° C.

The various aberrations in the zoom lenses comprising the numerical data shown in the first to seventh embodiments are shown in FIGS. 8-14 in succession. In these aberration graphs, spherical aberration, astigmatism and distortion are shown with respect to the shortest, intermediate and longest focal length conditions.

As can be seen from these aberration graphs, any of the embodiments has a maximum angle of view of 90 degrees or greater and a zoom ratio of 1.6 or greater and yet sufficient aberration correction is effected practically in the image circle (image height y—21.6 mm) for a 35 mm single lens reflex camera.

According to the present invention, as has been described above, there can be realized a wide angle zoom lens which has a maximum angle of view of 90 degress or greater and a zoom ratio of 1.6 or greater in a very compact configuration, and which maintains excellent imaging performance.

I claim:

1. A wide angle zoom lens having an angle of view of 90 degrees or greater at the wide angle end and a zoom ratio of 1.6 or greater and consisting of two lens groups which are, in succession from the object side, a divergent lens group and a convergent lens group, and in which magnification change is effected by relative movement of said two lens groups, said divergent lens group comprising at least two negative lenses and a positive lens disposed most adjacent to the image side, one of said negative lenses being formed of a low-index high-dispersion material having a refractive index of 1.5 or less and an Abbe number of 62 or less, said negtive lens formed of the low-index high-dispersion material having a non-spherical surface in which the difference in thickness between the central portion and the marginal edge portion is small, said wide angle zoom lens being characterized in that when said non-spherical surface is approximated by $$x = \frac{C_0 y^2}{1 + \sqrt{1 - C_0^2 y^2}} + C_4 y^4 + C_6 y^6 + C_8 y^8 + C_{10} y^{10},$$

said zoom lens satisfies the following conditions for coefficients $C_8$ an $C_{10}$:

$0 < |C_8| < 0.025 fw \times 10^{-7}$ $0 < |C_{10}| < 0.05 fw \times 10^{-9}$, where y is the distance from the optical axis, x is the distance from the tangential plane of the vertex of the non-spherical surface, $C_0$ is the paraxial curvature (the inverse number of the radius of paraxial curvature) at the vertex of the non-spherical surface, $C_4$ to $C_{10}$ are the fourth-order, sixth-order, eigth-order and tenth-order non-spherical surface coefficients, and fw is the focal length of the lens system at the wide angle end thereof.

2. A wide angle zoom lens according to claim 1, characterized in that the second negative lens from the object side in said divergent lens group has said non-spherical surface.

3. A wide angle zoom lens according to claim 2, characterized in that said second negative lens is a negative meniscus lens having its convex surface facing the object side, and said non-spherical surface is that surface of said negative meniscus lens which is adjacent to the object side.

4. A wide angle zoom lens having an angle of view of 90 degrees or greater at the wide angle end and a zoom ratio of 1.6 or greater and consisting of two lens groups which are, in succession from the object side, a divergent lens group and a convergent lens group, and in which magnification change is effected by relative movement of said two lens groups, said divergent lens group comprising at least two negative lenses and a positive lens disposed most adjacent to the image side, one of said negative lenses being formed of a low-index high-dispersion material having a refractive index of 1.5 or less and an Abbe number of 62 or less, said zoom lens being characterized in that said negative lens formed of the low-index high-dispersion material has a non-spherical surface in which the difference in thickness beteween the central portion and the marginal edge portion is small, in that when said non-spherical surface is approximated by $$x = \frac{C_0 y^2}{1 + \sqrt{1 - C_0^2 y^2}} + C_4 y^4 + C_6 y^6 + C_8 y^8 + C_{10} y^{10},$$

said zoom lens satisfies the following conditions for coefficients $C_8$ and $C_{10}$:

$0 < |C_8| < 0.025 fw \times 10^{-7}$ $0 < |C_{10}| < 0.05 fw \times 10^{-9}$, where y is the distance from the optical axis, x is the distance from the tangential plane of the vertex of the non-spherical surface, $C_0$ is the paraxial curvature (the inverse number of the radius of paraxial curvature) at the vertex of the non-spherical surface, $C_4$ to $C_{10}$ are the fourth-order, sixth-order, eighth-order and tenth-order non-spherical surface coefficients, and fw is the focal length of the lens system at the wide angle end thereof, in that the second negative lens from the object side in said divergent lens group has said non-spherical surface, in that said second negative lens is a negative meniscus lens having its convex surface facing the object side, and said non-spherical surface is that surface of said negative meniscus lens which is adjacent to the object side, and in that said zoom lens satisfies the following condition:

$0.02 < P_2/Pa < 0.7$ where $P_2$ is the refractive power of said negative meniscus lens and Pa is the refractive power of said divergent lens group.

5. A wide angle zoom lens having an angle of view of 90 degrees or greater at the wide angle end and a zoom ratio of 1.6 or greater and consisting of two lens groups which are, in succession from the object side, a divergent lens group and a convergent lens group, and in which magnification change is effected by relative movement of said two lens groups, said divergent lens group comprising at least two negative lenses and a positive lens disposed most adjacent to the image side, one of said negative lenses being formed of a low-index high-dispersion material having a refractive index of 1.5 or less and an Abbe number of 62 or less, said zoom lens being characterized in that said divergent lens group has, in succession from the object side, three negative meniscus lenses having their convex surfaces facing the object side, and a positive lens, said convergent lens group has, in succession from the object side, a positive lens, a positive lens having a center thickness greater than that of the preceding positive lens, a biconcave negative lens, a positive meniscus lens having its convex surface facing the image side, and a biconvex positive lens, and said zoom lens satisfies the following conditions:

| | | | | | |
|---|---|---|---|---|---|
| 0.9 | $\|Pa\|$ | < | $\|P_1\|$ | < | $\|Pa\|$, $P_1 < 0$ |
| 0.02 | $\|Pa\|$ | < | $\|P_2\|$ | < | $0.6 \|Pa\|$, $P_2 < 0$ |
| 0.4 | $\|Pa\|$ | < | $\|P_3\|$ | < | $0.9 \|Pa\|$, $P_3 < 0$ |
| 0.65 | $\|Pa\|$ | < | $P_4$ | < | $0.85 \|Pa\|$ |
| 0.3 | Pb | < | $P_5$ | < | 0.5 Pb |
| 0.7 | Pb | < | $P_6$ | < | 0.9 Pb |
| 1.6 | Pb | < | $P_7$ | < | 2.4 Pb, $P_7 < 0$ |
| 0.5 | Pb | < | $P_8$ | < | 1.6 Pb |

-continued $$0.4 \ Pb < P_9 < 0.9 \ Pb$$

where $P_1$, $P_2$, $P_3$, ... are the refractive powers of the successive lenses from the object side, Pa is the refractive power of said divergent lens group, and Pb is the refractive power of said convergent lens group.

6. A wide angle zoom lens according to claim 5, characterized in that numerical data are as follows:

| | f = 21.5~34.5 | F-number 3.5 | | | |
|---|---|---|---|---|---|
| | R | D | nd | νd | |
| 1 | 84.542 | 2.40 | 1.79668 | 45.5 | $G_1$ |
| 2 | 19.410 | 4.35 | | | |
| 3 | 29.211(*) | 2.00 | 1.49823 | 59.2 | $G_2$ |
| 4 | 23.432 | 4.00 | | | |
| 5 | 50.770 | 2.00 | 1.79668 | 45.5 | $G_3$ |
| 6 | 22.769 | 4.02 | | | |
| 7 | 31.521 | 5.00 | 1.72825 | 28.3 | $G_4$ |
| 8 | 422.700 | $d_8$ (variable) | | | |
| 9 | 83.264 | 3.50 | 1.67025 | 57.6 | $G_5$ |
| 10 | −127.798 | 1.00 | | | |
| 11 | .000 | 2.00 | | | |
| 12 | 22.500 | 10.00 | 1.48749 | 70.2 | $G_6$ |
| 13 | −194.056 | 6.00 | | | |
| 14 | −24.176 | 1.50 | 1.79504 | 28.6 | $G_7$ |
| 15 | 35.085 | 2.00 | | | |
| 16 | −131.908 | 3.50 | 1.50137 | 56.5 | $G_8$ |
| 17 | −16.629 | .40 | | | |
| 18 | 67.766 | 3.00 | 1.51680 | 64.1 | $G_9$ |
| 19 | −45.769 | B.F | | | |

Pa = −0.029  
Pb = 0.028  
$P_1$ = −0.031  
$P_2$ = −0.0041  
$P_3$ = −0.019  
$P_4$ = 0.021  
$P_5$ = 0.013  
$P_6$ = 0.024  
$P_7$ = −0.056  
$P_8$ = 0.027  
$P_9$ = 0.019

(*)Non-spherical surface coefficient  
$C_4 = 1.947 \times 10^{-5}$  
$C_6 = 2.18 \times 10^{-8}$  
$C_8 = 6.129 \times 10^{-11}$  
$C_{10} = 4.3 \times 10^{-13}$  
$d_8 = 22.84 \sim 0.84$  
B.F = 36.63~49.99 where the numbers at the left end of the table indicate the order from the object side, R represents the radius of curvature of each lens surface, D represents the center thickness and air space of each lens, nd and νd represent the refractive index and the Abbe number, respectively, of each lens for d-line.

7. A wide angle zoom lens having an angle of view of 90 degrees or greater at the wide angle end and a zoom ratio of 1.6 or greater and consisting of two lens groups which are, in succession from the object side, a divergent lens group and a convergent lens group, and in which magnification change is effected by relative movement of said two lens groups, said divergent lens group comprising at least two negative lenses and a positive lens disposed most adjacent to the image side, one of said negative lenses being formed of a low-index high-dispersion material having a refractive index of 1.5 or less and an Abbe number of 62 or less, said zoom lens being characterized in that said divergent lens group has, in succession from the object side, two negative meniscus lenses having their convex surfaces facing the object side and a positive meniscus lens having its convex surface facing the object side, said convergent lens group has, in succession from the object side, a positive lens, a negative meniscus lens having its convex surface facing the object side, a biconvex positive lens, a biconcave negative lens, a positive meniscus lens having its convex surface facing the image side, and a positive lens, and said zoom lens satisfies the following conditions:

$$0.4 \ |Pa| < |P_1| < 1.1 \ |Pa|, \ P_1 < 0$$
$$0.04 \ |Pa| < |P_2| < 0.7 \ |Pa|, \ P_2 < 0$$
$$0.05 \ |Pa| < P_3 < 0.6 \ |Pa|$$
$$0.4 \ Pb < P_4 < 0.9 \ Pb$$
$$-0.5 \ Pb < P_5 < 0.2 \ Pb$$
$$1.1 \ Pb < P_6 < 1.9 \ Pb$$
$$1.7 \ Pb < |P_7| < 2.6 \ Pb, \ P_7 < 0$$
$$0.4 \ Pb < P_8 < 0.95 \ Pb$$
$$0.35 \ Pb < P_9 < 0.8 \ Pb$$

where $P_1$, $P_2$, $P_3$, ... are the refractive powers of the successive lenses from the object side, Pa is the refractive power of said divergent lens group, and Pb is the refractive power of said convergent lens group.

8. A wide angle zoom lens according to claim 7, characterized in that numerical data are as follows:

| | f = 21.5~34.5 | F-number 3.5 | | | |
|---|---|---|---|---|---|
| | R | D | nd | νd | |
| 1 | 64.919 | 2.40 | 1.79797 | 47.5 | $G_1$ |
| 2 | 20.920 | 6.00 | | | |
| 3 | 33.477(*) | 2.00 | 1.49108 | 57.6 | $G_2$ |
| 4 | 20.822 | 6.00 | | | |
| 5 | 54.472 | 3.00 | 1.72825 | 28.3 | $G_3$ |
| 6 | 88.146 | $d_6$ (variable) | | | |
| 7 | 66.935 | 1.80 | 1.67270 | 57.6 | $G_4$ |
| 8 | −90.139 | 1.00 | | | |
| 9 | .000 | 2.00 | | | |
| 10 | 29.859 | 4.50 | 1.62588 | 35.6 | $G_5$ |
| 11 | −17.539 | 1.00 | 1.79668 | 45.5 | |
| 12 | 34.344 | .10 | | | |
| 13 | 22.330 | 9.50 | 1.54739 | 53.6 | $G_6$ |
| 14 | −25.976 | 2.00 | | | |
| 15 | −33.725 | 1.50 | 1.80518 | 25.4 | $G_7$ |
| 16 | 23.194 | 2.00 | | | |
| 17 | −53.782 | 3.50 | 1.50137 | 56.5 | $G_8$ |
| 18 | −18.255 | .40 | | | |
| 19 | 35.814 | 3.50 | 1.51860 | 70.1 | $G_9$ |
| 20 | −700.199 | B.F | | | |

Pa = −0.029  
Pb = 0.028  
$P_1$ = −0.025  
$P_2$ = 0.008  
$P_3$ = 0.005  
$P_4$ = 0.017  
$P_5$ = −0.010  
$P_6$ = 0.042  
$P_7$ = −0.059  
$P_8$ = 0.019  
$P_9$ = 0.015

(*)Non-spherical surface coefficient  
$C_4 = 1.7 \times 10^{-5}$  
$C_6 = -4.521 \times 10^{-10}$  
$C_8 = -3.719 \times 10^{-14}$  
$C_{10} = 3.4 \times 10^{-13}$  
$d_6 = 37.28 \sim 15.27$  
B.F = 36.76~50.11 where the numbers at the left end of the table indicate the order from the object side, R represents the radius of curvature of each lens surface, D represents the center thickness and air space of each lens, nd and νd represent the refractive index and the Abbe number, respectively, of each lens for d-line.

9. A wide angle zoom lens having an angle of view of 90 degrees or greater at the wide angle end and a zoom ratio of 1.6 or greater and consisting of two lens groups which are, in succession from the object side, a divergent lens group and a convergent lens group, and in which magnification change is effected by relative movement of said two lens groups, said divergent lens group comprising at least two negative lenses and a positive lens disposed most adjacent to the image side, one of said negative lenses being formed of a low-index high-dispersion material having a refractive index of 1.5 or less and an Abbe number of 62 or less, said zoom lens being characterized in that said divergent lens group has, in succession from the object side, two negative meniscus lenses having their convex surfaces facing the object side and a positive meniscus lens having its convex surface facing the object side, said convergent lens group has, in succession from the object side, a positive lens, a positive lens having a center thickness greater than that of the preceding positive lens, a biconcave negative lens, a positive meniscus lens having its convex surface facing the image side, and a biconvex positive lens, and said zoom lens satisfies the following conditions:

$$0.9 \, |Pa| < |P_1| < 0.98 \, |Pa|, \, P_1 < 0$$
$$0.3 \, |Pa| < |P_2| < 0.5 \, |Pa|, \, P_2 < 0$$
$$0.2 \, |Pa| < P_3 < 0.35 \, |Pa|$$
$$0.3 \, Pb < P_4 < 1.3 \, Pb$$
$$0.7 \, Pb < P_5 < 1.2 \, Pb$$
$$1.8 \, Pb < |P_6| < 2.3 \, Pb, \, P_6 < 0$$
$$0.5 \, Pb < P_7 < 0.9 \, Pb$$
$$0.5 \, Pb < P_8 < 0.9 \, Pb$$

where $P_1$, $P_2$, $P_3$, ... are the refractive powers of the successive lenses from the object side, Pa is the refractive power of said divergent lens group, and Pb is the refractive power of said convergent lens group.

10. A wide angle zoom lens according to claim 9, characterized in that numerical data are as follows:

| | f = 21.5~34.5 | F-number 3.5 | | | |
|---|---|---|---|---|---|
| | R | D | nd | νd | |
| 1 | 67.667 | 2.40 | 1.78797 | 47.5 | G₁ |
| 2 | 19.923 | 3.00 | | | |
| 3 | 32.887(*) | 2.00 | 1.49108 | 57.6 | G₂ } A |
| 4 | 19.102 | 14.95 | | | |
| 5 | 30.337 | 5.00 | 1.72825 | 28.3 | G₃ |
| 6 | 41.162 | d₆ (variable) | | | |
| 7 | 66.543 | 3.50 | 1.67270 | 32.2 | G₄ |
| 8 | −152.688 | 1.00 | | | |
| 9 | .000 | 2.00 | | | |
| 10 | 19.809 | 10.00 | 1.48749 | 70.2 | G₅ |
| 11 | −125.581 | 3.16 | | | |
| 12 | −22.325 | 1.50 | 1.79504 | 28.6 | G₆ } B |
| 13 | 31.687 | 2.00 | | | |
| 14 | −48.870 | 3.50 | 1.50137 | 56.5 | G₇ |
| 15 | −15.939 | .40 | | | |
| 16 | 67.545 | 5.00 | 1.51860 | 70.1 | G₈ |
| 17 | −37.800 | B.F | | | |

Pa = −0.029  (*)Non-spherical surface coefficient
Pb = 0.028   $C_4 = 2.14 \times 10^{-5}$
$P_1$ = −0.027  $C_6 = 1.23 \times 10^{-8}$
$P_2$ = −0.010  $C_8 = -5.72 \times 10^{-11}$
$P_3$ = 0.008  $C_{10} = 5.823 \times 10^{-13}$
$P_4$ = 0.014  $d_6 = 22.6 \sim 0.6$
$P_5$ = 0.028  B.F = 38.06 ~ 51.4
$P_6$ = −0.061
$P_7$ = 0.022
$P_8$ = 0.021 where the numbers at the left end of the table indicate the order from the object side, R represents the radius of curvature of each lens surface, D represents the center thickness and air space of each lens, and nd and νd represent the refractive index and the Abbe number, respectively, of each lens for d-line.

11. A wide angle zoom lens having an angle of view of 90 degrees or greater at the wide angle end and a zoom ratio of 1.6 or greater and consisting of two lens groups which are, in succession from the object side, a divergent lens group and a convergent lens group, and in which magnification change is effected by relative movement of said two lens groups, said divergent lens group comprising at least two negative lenses and a positive lens disposed most adjacent to the image side, one of said negative lenses being formed of a low-index high-dispersion material having a refractive index of 1.5 or less and an Abbe number of 62 or less, said zoom lens being characterized in that said divergent lens group has, in succession from the object side, three negative meniscus lenses having their convex surfaces facing the object side and a positive lens having its convex surface facing the object side, said convergent lens group having, in succession from the object side, a positive lens, a negative meniscus lens comprising a cemented lens and having its convex surface facing the object side, a biconvex positive lens comprising a cemented lens, a biconcave negative lens, a positive meniscus lens having its convex surface facing the image side, and a positive lens, and said zoom lens satisfies the following conditions:

$$0.3 \, |Pa| < |P_1| < 1.2 \, |Pa|, \, P_1 < 0$$
$$0.02 \, |Pa| < |P_2| < 0.9 \, |Pa|, \, P_2 < 0$$
$$0.3 \, |Pa| < |P_3| < 0.9 \, |Pa|, \, P_3 < 0$$
$$0.2 \, |Pa| < P_4 < 0.8 \, |Pa|$$
$$0.3 \, Pb < P_5 < 1.3 \, Pb$$
$$-0.5 \, Pb < P_6 < 0.5 \, Pb$$
$$0.7 \, Pb < P_7 < 1.4 \, Pb$$
$$1.4 \, Pb < |P_8| < 2.2 \, Pb, \, P_8 < 0$$
$$0.3 \, Pb < P_9 < 1.0 \, Pb$$
$$0.3 \, Pb < P_{10} < 0.8 \, Pb$$

where $P_1$, $P_2$, $P_3$, ... are the refractive powers of the successive lenses from the object side, Pa is the refractive power of said divergent lens group, and Pb is the refractive power of said convergent lens group.

12. A wide angle zoom lens according to claim 11, characterized in that numerical data are as follows:

| | f = 21.5~40.43 | F-number 3.5~4.5 | | | |
|---|---|---|---|---|---|
| | R | D | nd | νd | |
| 1 | 64.000 | 2.40 | 1.78797 | 47.5 | G₁ |
| 2 | 25.000 | 4.35 | | | |
| 3 | 32.377(*) | 2.00 | 1.49823 | 59.2 | G₂ } A |
| 4 | 20.597 | 4.00 | | | |
| 5 | 52.000 | 2.00 | 1.78797 | 47.5 | G₃ |
| 6 | 23.391 | 8.00 | | | |
| 7 | 30.761 | 3.00 | 1.72825 | 28.3 | G₄ |
| 8 | 73.742 | d₈ (variable) | | | |
| 9 | 66.015 | 1.80 | 1.66446 | 35.9 | G₅ |
| 10 | −83.552 | 1.00 | | | |
| 11 | .000 | 2.00 | | | |
| 12 | 28.422 | 3.00 | 1.62230 | 53.1 | G₆ |
| 13 | −19.165 | 1.00 | 1.79668 | 45.5 | |
| 14 | 33.767 | .10 | | | |
| 15 | 21.715 | 1.00 | 1.54739 | 53.6 | G₇ } B |
| 16 | 16.010 | 4.00 | 1.54814 | 45.9 | |
| 17 | −52.192 | 3.10 | | | |
| 18 | −41.838 | 1.50 | 1.80518 | 25.4 | G₈ |

-continued

| | | f = 21.5~40.43 | F-number 3.5~4.5 | | |
|---|---|---|---|---|---|
| 19 | 25.090 | 2.00 | | | |
| 20 | −49.505 | 3.50 | 1.50137 | 56.5 | $G_9$ |
| 21 | −18.307 | .40 | | | |
| 22 | 323.983 | 2.80 | 1.51835 | 60.3 | $G_{10}$ |
| 23 | −32.421 | B.F | | | |

$P_a = -0.029$      (*)Non-spherical surface coefficient
$P_b = 0.028$       $C_4 = 1.365 \times 10^{-5}$
$P_1 = -0.019$      $C_6 = 1.277 \times 10^{-9}$
$P_2 = -0.008$      $C_8 = 4.86 \times 10^{-11}$
$P_3 = -0.018$      $C_{10} = 7 \times 10^{-14}$
$P_4 = 0.014$       $d_8 = 27.79 \sim 0.45$
$P_5 = 0.018$       $B.F = 41.11 \sim 60.55$
$P_6 = -0.009$
$P_7 = 0.035$
$P_8 = -0.052$
$P_9 = 0.018$
$P_{10} = 0.018$ where the numbers at the left end of the table indicate the order from the object side, R represents the radius of curvature of each lens surface, D represents the center thickness and air space of each lens, nd and νd represent the refractive index and the Abbe number, respectively, of each lens for d-line.

13. A wide angle zoom lens having an angle of view of 90 degrees or greater at the wide angle end and a zoom ratio of 1.6 or greater and consisting of two lens groups which are, in succession from the object side, a divergent lens group and a convergent lens group, and in which magnification change is effected by relative movement of said two lens groups, said divergent lens group comprising at least two negative lenses and a positive lens disposed most adjacent to the image side, one of said negative lenses being formed of a low-index high-dispersion material havinng a refractive index of 1.5 or less and an Abbe number of 62 or less, said zoom lens being characterized in that said divergent lens group has, in succession from the object side, three negative meniscus lenses having their convex surfaces facing the object side and a positive lens, said convergent lens group has, in succession from the object side, a biconvex positive lens, a negative meniscus lens comprising a cemented lens and having its convex surface facing the object side, a positive lens, a negative lens having its concave surface of sharper curvature facing the image side, and a positive lens having its convex surface of sharper curvature facing the image side, and said zoom lens satisfies the following conditions:

$$0.3 |P_a| < |P_1| < 0.9 |P_a|, P_1 < 0$$
$$0.1 |P_a| < |P_2| < 0.8 |P_a|, P_2 < 0$$
$$0.2 |P_a| < |P_3| < 0.8 |P_a|, P_3 < 0$$
$$0.3 |P_a| < P_4 < 0.7 |P_a|$$
$$0.4 P_b < P_5 < 1.1 P_b$$
$$-0.4 P_b < P_6 < 0.4 P_b$$
$$0.3 P_b < P_7 < 1.2 P_b$$
$$0.7 P_b < P_8 < 1.9 P_b$$
$$0.7 P_b < P_9 < 1.6 P_b$$

where $P_1, P_2, P_3, \ldots$ are the refractive powers of the successive lenses from the object side, Pa is the refractive power of said divergent lens group, and Pb is the refractive power of said convergent lens group.

14. A wide angle zoom lens according to claim 13, characterized in that numerical data are as follows:

| | f = 21.5~40.43 | F-number 3.5~4.5 | | | |
|---|---|---|---|---|---|
| | R | D | nd | νd | |
| 1 | 64.249 | 2.40 | 1.78797 | 47.5 | $G_1$ |
| 2 | 23.675 | 4.35 | | | |
| 3 | 44.977(*) | 2.00 | 1.49823 | 59.2 | $G_2$ |
| 4 | 22.143 | 4.00 | | | A |
| 5 | 38.293 | 2.00 | 1.78797 | 47.5 | $G_3$ |
| 6 | 23.472 | 8.85 | | | |
| 7 | 30.745 | 3.00 | 1.72825 | 28.3 | $G_4$ |
| 8 | 64.848 | $d_8$ (variable) | | | |
| 9 | 82.520 | 1.80 | 1.67270 | 32.2 | $G_5$ |
| 10 | −82.687 | 1.00 | | | |
| 11 | .000 | 2.00 | | | |
| 12 | 27.869 | 3.00 | 1.62230 | 53.1 | $G_6$ |
| 13 | −20.530 | 1.00 | 1.79631 | 41.0 | B |
| 14 | 39.101 | .10 | | | |
| 15 | 27.071 | 5.00 | 1.54739 | 53.6 | $G_7$ |
| 16 | −285.620 | 4.17 | | | |
| 17 | 125.878 | 1.50 | 1.80518 | 25.4 | $G_8$ |
| 18 | 21.151 | 2.00 | | | |
| 19 | 186.118 | 5.00 | 1.62041 | 60.3 | $G_9$ |
| 20 | −24.269 | B.F | | | |

$P_a = -0.029$      (*)Non-spherical surface coefficient
$P_b = 0.028$       $C_4 = 1.345 \times 10^{-5}$
$P_1 = -0.020$      $C_6 = 2.447 \times 10^{-9}$
$P_2 = -0.011$      $C_8 = 3.162 \times 10^{-11}$
$P_3 = -0.012$      $C_{10} = 3.393 \times 10^{-14}$
$P_4 = 0.013$       $d_8 = 28.13 \sim 0.79$
$P_5 = 0.016$       $B.F = 41.18 \sim 60.62$
$P_6 = -0.005$
$P_7 = 0.022$
$P_8 = -0.031$
$P_9 = 0.029$ where the numbers at the left end of the table indicate the order from the object side, R represents the radius of curvature of each lens surface, D represents the center thickness and air space of each lens, nd and νd represent the refractive index and the Abbe number, respectively, of each lens for d-line.

15. A wide angle zoom lens having an angle of view of 90 degrees or greater at the wide angle end and a zoom ratio of 1.6 or greater and consisting of two lens groups which are, in succession from the object side, a divergent lens group and a convergent lens group, and in which magnification change is effected by relative movement of said two lens groups, said divergent lens group comprising at least two negative lenses and a positive lens disposed most adjacent to the image side, one of said negative lenses being formed of a low-index high-dispersion material having a refractive index of 1.5 or less and an Abbe number of 62 or less, said zoom lens being characterized in that said divergent lens group has, in succession from the object side, three negative meniscus lenses having their convex surfaces facing the object side, and a positive lens, said convergent lens group has, in succession from the object side, a positive lens, a negative meniscus lens comprising a cemented lens and having its convex surface facing the object side, a biconvex positive lens, a biconcave negative lens, a positive meniscus lens having its convex surface facing the image side, and a positive lens, and said zoom lens satisfies the following conditions:

$$0.5 |P_a| < |P_1| < 1.5 |P_a|, P_1 < 0$$
$$0.02 |P_a| < |P_2| < 0.5 |P_a|, P_2 < 0$$
$$0.3 |P_a| < |P_3| < 0.9 |P_a|, P_3 < 0$$

-continued

```
0.3  |Pa|  <  P_4    < 0.9 |Pa|
0.4   Pb   <  P_5    < 1.2  Pb
-0.6  Pb   <  P_6    < 0.6  Pb
0.7   Pb   <  P_7    < 1.5  Pb
1.1   Pb   < |P_8|   < 2.4  Pb, Pb_8 < 0
0.3   Pb   <  P_9    < 1.1  Pb
0.4   Pb   <  P_10   < 1.1  Pb
``` where $P_1, P_2, P_3, \ldots$ are the refractive powers of the successive lenses from the object side, Pa is the refractive power of said divergent lens group, and Pb is the refractive power of said convergent lens group.

16. A wide angle zoom lens according to claim 15, characterized in that numerical data are as follows:

| | f = 21.5~34.5 | F-number 3.5 | | | |
|---|---|---|---|---|---|
| | R | D | nd | νd | |
| 1 | 76.293 | 2.40 | 1.79668 | 45.5 | G_1 |
| 2 | 20.705 | 4.35 | | | |
| 3 | 31.590(*) | 2.00 | 1.49823 | 59.2 | G_2 |
| 4 | 21.102 | 4.00 | | | |
| 5 | 48.496 | 2.00 | 1.79668 | 45.5 | G_3 |
| 6 | 24.910 | 5.58 | | | |
| 7 | 30.883 | 3.00 | 1.72825 | 28.3 | G_4 |
| 8 | 124.590 | d_8 (variable) | | | |
| 9 | 63.647 | 1.80 | 1.67270 | 32.2 | G_5 |
| 10 | -84.941 | 1.00 | | | |
| 11 | .000 | 2.00 | | | |
| 12 | 28.866 | 4.50 | 1.62230 | 53.1 | G_6 |
| 13 | -18.391 | 1.00 | 1.79668 | 45.5 | |
| 14 | 33.240 | .10 | | | |
| 15 | 24.396 | 3.50 | 1.54739 | 53.6 | G_7 |
| 16 | -38.669 | 1.78 | | | |
| 17 | -44.091 | 7.00 | 1.80518 | 25.4 | G_8 |
| 18 | 26.739 | 2.00 | | | |
| 19 | -69.572 | 3.50 | 1.50137 | 56.5 | G_9 |
| 20 | -19.213 | .40 | | | |
| 21 | 183.998 | 2.80 | 1.62041 | 60.3 | G_10 |
| 22 | -53.387 | B.F | | | |

Groups A: G_1–G_4; B: G_5–G_10

```
Pa  = -0.029        (*)Non-spherical surface coefficient
Pb  =  0.028        C_4  = 1.956 × 10^-5
P_1 = -0.027        C_6  = 1.5   × 10^-8
P_2 = -0.007        C_8  = 2.614 × 10^-11
P_3 = -0.015        C_10 = 2.83  × 10^-13
P_4 =  0.018        d_8  = 26.53 ~ 4.52
P_5 =  0.018        B.F  = 39.3 ~ 52.65
P_6 = -0.010
P_7 =  0.036
P_8 = -0.051
P_9 =  0.019
P_10 = 0.015
``` where the numbers at the left end of the table indicate the order from the object side, R represents the radius of curvature of each lens surface, D represents the center thickness and air space of each lens, nd and νd represent the refractive index and the Abbe number, respectively, of each lens for d-line.

17. A wide angle zoom lens having an angle of view of 90 degrees or greater at the wide angle end and a zoom ratio of 1.6 or greater and consisting of two lens groups which are, in succession from the object side, a divergent lens group and a convergent lens group, and in which magnification change is effected by relative movement of said two lens groups, said divergent lens group comprising at least two negative lenses and a positive lens disposed most adjacent to the image side, one of said negative lenses being formed of a low-index high-dispersion material having a refractive index of 1.5 or less and an Abbe number of 62 or less, said zoom lens being characterized in that said divergent lens group has, in succession from the object side, three negative meniscus lenses having their convex surfaces facing the object side and a positive lens, said convergent lens group has, in succession from the object side, a positive lens, a positive lens having a center thickness greater than that of the preceding positive lens, a negative lens, and two positive meniscus lenses having their convex surfaces facing the image side, and said zoom lens satisfies the following conditions:

```
0.4  |Pa|  <  |P_1|   < 1.3  |Pa|, P_1 < 0
0.1  |Pa|  <  |P_2|   < 0.5  |Pa|, P_2 < 0
0.3  |Pa|  <  |P_3|   < 0.9  |Pa|, P_3 < 0
0.45 |Pa|  <   P_4    < 0.95 |Pa|
0.3   Pb   <   P_5    < 0.9   Pb
0.4   Pb   <   P_6    < 1.3   Pb
1.0   Pb   <  |P_7|   < 2.3   Pb, P_7 < 0
0.4   Pb   <   P_8    < 1.2   Pb
0.4   Pb   <   P_9    < 1.2   Pb
``` where $P_1, P_2, P_3, \ldots$ are the refractive powers of the successive lenses from the object side, Pa is the refractive power of said divergent lens group, and Pb is the refractive power of said convergent lens group.

18. A wide angle zoom lens according to claim 17, characterized in that numerical data are as follows:

| | f = 21.5~34.5 | F-number 3.5 | | | |
|---|---|---|---|---|---|
| | R | D | nd | νd | |
| 1 | 84.326 | 2.40 | 1.79668 | 45.5 | G_1 |
| 2 | 20.368 | 4.35 | | | |
| 3 | 31.281(*) | 2.00 | 1.49823 | 59.2 | G_2 |
| 4 | 21.508 | 4.00 | | | |
| 5 | 61.688 | 2.00 | 1.79668 | 45.5 | G_3 |
| 6 | 26.543 | 5.64 | | | |
| 7 | 33.660 | 3.00 | 1.72825 | 28.3 | G_4 |
| 8 | 312.886 | d_8 (variable) | | | |
| 9 | 64.509 | 1.80 | 1.67270 | 32.2 | G_5 |
| 10 | -92.241 | 1.00 | | | |
| 11 | .000 | 2.00 | | | |
| 12 | 29.037 | 4.50 | 1.62230 | 53.1 | G_6 |
| 13 | -19.720 | 4.50 | 1.79886 | 34.0 | |
| 14 | -61.925 | 2.11 | | | |
| 15 | -44.877 | 7.00 | 1.80518 | 25.4 | G_7 |
| 16 | 27.045 | 2.00 | | | |
| 17 | -62.708 | 3.50 | 1.50137 | 56.5 | G_8 |
| 18 | -20.201 | .40 | | | |
| 19 | -135.756 | 2.80 | 1.62299 | 58.2 | G_9 |
| 20 | -29.338 | B.F | | | |

Groups A: G_1–G_4; B: G_5–G_9

```
Pa  = -0.029         (*)Non-spherical surface coefficient
Pb  =  0.028         C_4  = 2.088 × 10^-5
P_1 = -0.029         C_6  = 1.798 × 10^-8
P_2 = -0.007         C_8  = 3.644 × 10^-11
P_3 = -0.017         C_10 = 2.63  × 10^-13
P_4 =  0.019         d_8  = 23.84 ~ 1.84
P_5 =  0.018         B.F  = 39.54 ~ 52.89
P_6 =  0.025
P_7 = -0.050
P_8 =  0.017
P_9 =  0.017
``` where the numbers at the left end of the table indicate the order from the object side, R represents the radius of curvature of each lens surface, D represents the center thickness and air space of each lens, nd and νd represent the refractive index and the Abbe number, respectively, of each lens for d-line.

* * * * *